(12) United States Patent
Caldwell

(10) Patent No.: US 11,563,737 B2
(45) Date of Patent: *Jan. 24, 2023

(54) AGGREGATION PLATFORM PERMISSIONS

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 80 days.

This patent is subject to a terminal disclaimer.

(21) Appl. No.: 17/164,793

(22) Filed: Feb. 1, 2021

(65) Prior Publication Data

US 2021/0185031 A1   Jun. 17, 2021

Related U.S. Application Data

(63) Continuation of application No. 16/159,417, filed on Oct. 12, 2018, now Pat. No. 10,911,439.

(Continued)

(51) Int. Cl.
*H04L 29/06* (2006.01)
*H04L 29/08* (2006.01)
(Continued)

(52) U.S. Cl.
CPC .......... *H04L 63/083* (2013.01); *H04L 67/306* (2013.01); *H04L 67/53* (2022.05); *G06F 21/604* (2013.01); *G06F 21/6245* (2013.01); *H04L 63/08* (2013.01); *H04L 63/0815* (2013.01); *H04L 63/0892* (2013.01); *H04L 63/102* (2013.01); *H04L 67/10* (2013.01);
(Continued)

(58) Field of Classification Search
CPC ...... H04L 63/083; H04L 67/53; H04L 67/306
USPC .......................................................... 726/28
See application file for complete search history.

(56) References Cited

U.S. PATENT DOCUMENTS 8,613,066 B1   12/2013   Brezinski et al.
9,191,382 B1   11/2015   Hornung
(Continued)

OTHER PUBLICATIONS

U.S. Appl. No. 16/159,420 Final Office Action, dated Mar. 10, 2021.
(Continued)

*Primary Examiner* — Haresh N Patel
(74) *Attorney, Agent, or Firm* — Kunzler Bean & Adamson

(57) ABSTRACT

Apparatuses, systems, methods, and computer program products are presented for aggregation platform permissions. A hardware computing device is configured to aggregate a user's data from a first plurality of third-party service providers for the user to access through a second plurality of third-party service providers. A permissions module is configured to monitor which of a second plurality of third-party service providers have access to which portions of data from which of a first plurality of third-party service providers. A graphical user interface is configured to display one or more user interface elements allowing a user to grant and/or revoke access to portions of data from a first plurality of third-party service providers individually to a second plurality of third-party service providers and an interface to update a password that the second plurality of third-party service providers uses to access the user's data from the first plurality of third-party service providers.

20 Claims, 13 Drawing Sheets

Related U.S. Application Data

(60) Provisional application No. 62/571,784, filed on Oct. 12, 2017, provisional application No. 62/571,788, filed on Oct. 12, 2017.

(51) Int. Cl.

| | | |
|---|---|---|
| *H04L 9/40* | (2022.01) | |
| *H04L 67/306* | (2022.01) | |
| *H04L 67/53* | (2022.01) | |
| *G06F 21/60* | (2013.01) | |
| *H04L 67/125* | (2022.01) | |
| *H04L 67/10* | (2022.01) | |
| *H04L 67/50* | (2022.01) | |
| *H04L 67/566* | (2022.01) | |
| *G06F 21/62* | (2013.01) | |
| *H04L 67/146* | (2022.01) | |

(52) U.S. Cl.
CPC .......... *H04L 67/125* (2013.01); *H04L 67/146* (2013.01); *H04L 67/535* (2022.05); *H04L 67/566* (2022.05)

(56) References Cited

U.S. PATENT DOCUMENTS

| | | | |
|---|---|---|---|
| 9,521,642 B2 | 4/2016 | Benoit et al. | |
| 9,357,385 B2 | 5/2016 | Benoit et al. | |
| 9,363,256 B2* | 6/2016 | Caldwell | G06Q 20/425 |
| 9,515,999 B2 | 12/2016 | Ylonen | |
| 9,986,093 B2* | 5/2018 | Adams | H04L 67/02 |
| 10,042,999 B2 | 8/2018 | Li et al. | |
| 10,154,025 B2 | 12/2018 | Tinnakornsrisuphap et al. | |
| 10,362,007 B2 | 7/2019 | Hill | |
| 10,387,851 B1* | 8/2019 | Krajicek | G06Q 20/108 |
| 10,671,749 B2 | 6/2020 | Felice-steele et al. | |
| 10,880,313 B2 | 12/2020 | Manna et al. | |
| 2003/0140230 A1 | 7/2003 | de Jong et al. | |
| 2006/0224518 A1 | 10/2006 | Khusial et al. | |
| 2007/0204308 A1* | 8/2007 | Nicholas | H04N 7/17318 725/86 |
| 2008/0126476 A1* | 5/2008 | Nicholas | G06Q 10/10 709/203 |
| 2012/0069131 A1 | 3/2012 | Abelow | |
| 2012/0078765 A1* | 3/2012 | Gopynadhan | G06Q 40/00 705/35 |
| 2012/0079570 A1 | 3/2012 | Fu et al. | |
| 2012/0289147 A1* | 11/2012 | Raleigh | H04N 21/25808 455/3.06 |
| 2013/0132854 A1* | 5/2013 | Raleigh | G06F 3/0482 715/738 |
| 2013/0198521 A1* | 8/2013 | Wu | H04L 9/3263 713/175 |
| 2014/0012613 A1* | 1/2014 | Diamond | G06Q 10/06311 705/7.13 |
| 2014/0310385 A1 | 10/2014 | Zhang | |
| 2014/0324502 A1 | 10/2014 | McCullough et al. | |
| 2014/0337175 A1 | 11/2014 | Katzin et al. | |
| 2015/0002604 A1 | 1/2015 | Theurer et al. | |
| 2015/0026049 A1* | 1/2015 | Theurer | G06Q 20/36 705/41 |
| 2015/0011362 A1 | 4/2015 | Alvarez et al. | |
| 2015/0113626 A1* | 4/2015 | Bocanegra Alvarez | H04L 63/0815 726/8 |
| 2015/0180857 A1 | 6/2015 | Schulman et al. | |
| 2015/0324400 A1 | 11/2015 | Sheck et al. | |
| 2015/0331567 A1* | 11/2015 | Crooks | G06F 3/0484 715/734 |
| 2015/0379488 A1* | 12/2015 | Ruff | G06Q 40/06 705/40 |
| 2016/0005019 A1 | 2/2016 | Kanov et al. | |
| 2016/0050193 A1* | 2/2016 | Kanov | H04W 12/069 726/7 |
| 2016/0218875 A1 | 7/2016 | Le Saint et al. | |
| 2016/0343037 A1* | 11/2016 | Nicholas | G06Q 30/0269 |
| 2017/0201850 A1* | 7/2017 | Raleigh | H04W 4/50 |
| 2017/0222804 A1* | 8/2017 | Dewitt | H04L 9/0891 |
| 2017/0359338 A1 | 12/2017 | Tschofenig et al. | |
| 2017/0374070 A1 | 12/2017 | Shah et al. | |
| 2019/0108585 A1* | 4/2019 | Caldwell | G06Q 40/025 |
| 2019/0114444 A1* | 4/2019 | Caldwell | H04L 67/306 |
| 2019/0116171 A1* | 4/2019 | Caldwell | H04L 67/53 |
| 2019/0116172 A1* | 4/2019 | Caldwell | H04L 63/083 |
| 2020/0136821 A1* | 4/2020 | Dewitt | H04L 9/0897 |
| 2021/0042764 A1 | 2/2021 | Rungta et al. | |
| 2021/0152541 A1 | 5/2021 | Caldwell | |
| 2021/0185029 A1 | 6/2021 | Caldwell | |
| 2021/0185030 A1 | 6/2021 | Caldwell | |

OTHER PUBLICATIONS

U.S. Appl. No. 16/159,405 Office Action, dated Apr. 5, 2021.
CA Patent Application 3,047,568 Office Action, dated Jul. 12, 2021.
U.S. Appl. No. 17/390,960 Office Action, dated Sep. 19, 2022.
U.S. Appl. No. 17/164,791 Notice of Allowance, dated Sep. 21, 2022.
U.S. Appl. No. 17/164,783 Notice of Allowance, dated Oct. 4, 2022.
U.S. Appl. No. 17/164,786 Notice of Allowance, dated Oct. 12, 2022.
U.S. Appl. No. 17/390,958 Final Office Action, dated Dec. 14, 2022.

\* cited by examiner

AGGREGATION PLATFORM PERMISSIONS

CROSS-REFERENCES TO OTHER APPLICATIONS

This application is a continuation of U.S. patent application Ser. No. 16/159,417, now U.S. Pat. No. 10,911,439, entitled "AGGREGATION PLATFORM PERMISSIONS" and filed on Oct. 12, 2018, for John Ryan Caldwell, which claims the benefit of U.S. Provisional Patent Application No. 62/571,784 entitled "AGGREGATION PLATFORM PORTAL" and filed on Oct. 12, 2017, for John Ryan Caldwell, and of U.S. Provisional Patent Application No. 62/571,788 entitled "AGGREGATION PLATFORM PERMISSIONS" and filed on Oct. 12, 2017, for John Ryan Caldwell, each of which is incorporated herein by reference.

FIELD

This invention relates to aggregation of a user's data and more particularly relates to permissions for an aggregation platform.

BACKGROUND

As users authorize multiple entities to access their online data, managing these authorizations becomes increasingly complex. A user may not know where or how to determine which entities are aggregating their data, how to change or revoke authorizations, or the like. Further, multiple entities accessing the same data for a user from a third-party may be inefficient or may lead the third party to block the user or one or more of the entities.

SUMMARY

Apparatuses are presented for aggregation platform permissions. In one embodiment, a hardware computing device is configured to aggregate a user's data from a first plurality of third-party service providers over a data network for the user to access through a second plurality of third-party service providers. A permissions module, in certain embodiments, is configured to monitor which of a second plurality of third-party service providers have access to which portions of data from which of a first plurality of third-party service providers. A graphical user interface, in some embodiments, is configured to display one or more user interface elements allowing a user to grant and/or revoke access to portions of data from a first plurality of third-party service providers individually to a second plurality of third-party service providers and an interface for the user to update a password that the second plurality of third-party service providers uses to access the user's data from at least one of the first plurality of third-party service providers.

Methods are presented for aggregation platform permissions. A method, in one embodiment, includes aggregating a user's data to a hardware computing device from a first plurality of third-party service providers over a data network for the user to access through a second plurality of third-party service providers. A method, in a further embodiment, includes monitoring which of a second plurality of third-party service providers have access to which portions of data from which of a first plurality of third-party service providers. In some embodiments, a method includes displaying in a graphical user interface one or more user interface elements allowing a user to grant and/or revoke access to portions of data from a first plurality of third-party service providers individually to a second plurality of third-party service providers and an interface for the user to update a password that the second plurality of third-party service providers uses to access the user's data from at least one of the first plurality of third-party service providers.

Additional apparatuses are presented for aggregation platform permissions. An apparatus, in one embodiment, includes means for aggregating a user's data to a hardware computing device from a first plurality of third-party service providers over a data network for the user to access through a second plurality of third-party service providers. In certain embodiments, an apparatus includes means for monitoring which of a second plurality of third-party service providers have access to which portions of data from which of a first plurality of third-party service providers. An apparatus, in a further embodiment, includes means for displaying in a graphical user interface one or more user interface elements allowing a user to grant and/or revoke access to portions of data from a first plurality of third-party service providers individually to a second plurality of third-party service providers and an interface for the user to update a password that the second plurality of third-party service providers uses to access the user's data from at least one of the first plurality of third-party service providers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
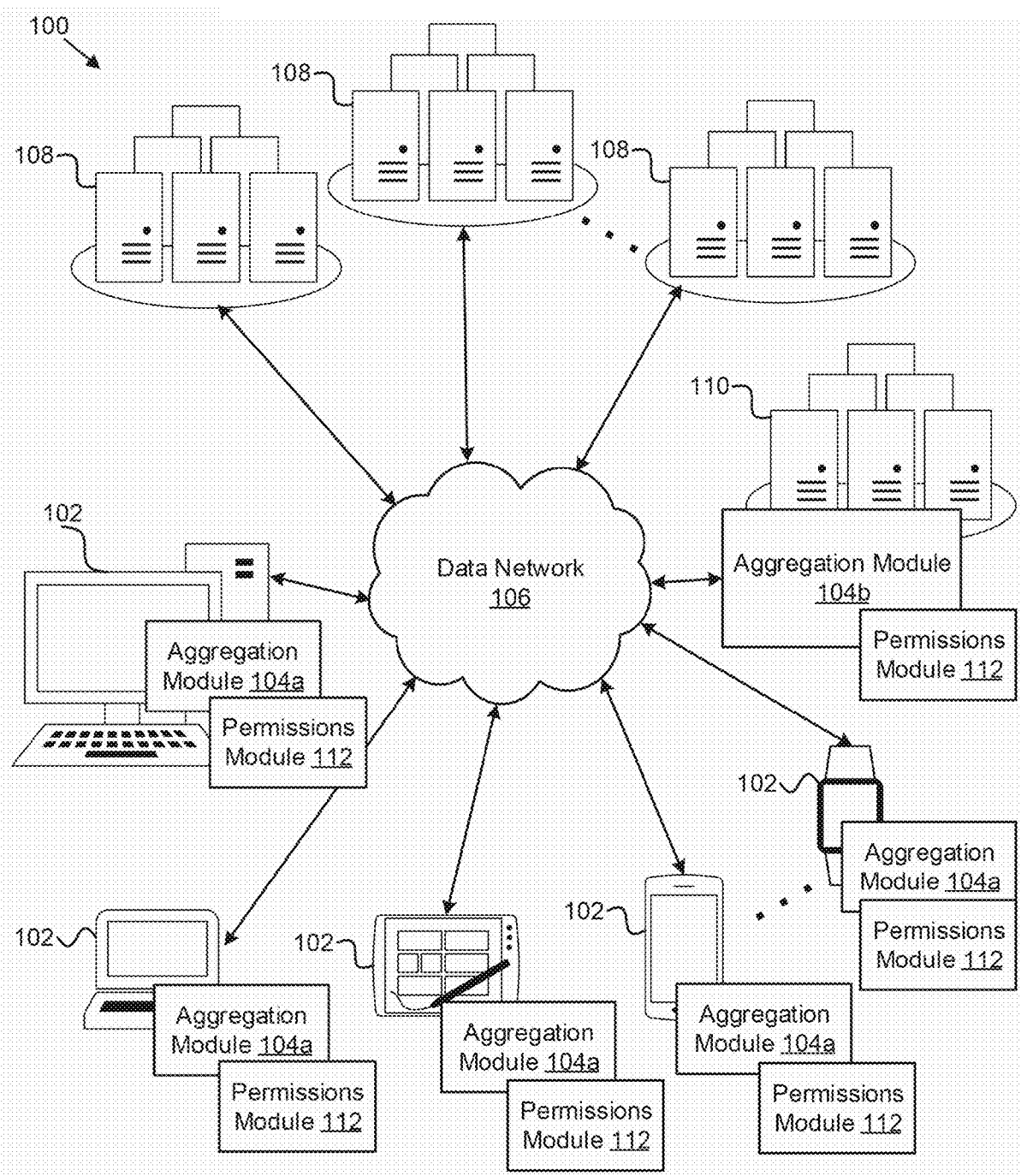
FIG. 1 is a schematic block diagram illustrating one embodiment of a system for aggregation platform permissions.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for aggregation platform permissions. In one embodiment, the system 100 includes one or more hardware devices 102, one or more aggregation modules 104 (e.g., a backend aggregation module 104b and/or a plurality of aggregation modules 104a disposed on the one or more hardware devices 102), one or more data networks 106 or other communication channels, one or more third-party service providers 108 (e.g., one or more servers 108 of one or more service providers 108; one or more cloud or network service providers, or the like), and/or one or more backend servers 110. In certain embodiments, even though a specific number of hardware devices 102, aggregation modules 104, data networks 106, third-party service providers 108, and/or backend servers 110 are depicted in FIG. 1, one of skill in the art will recognize, in light of this disclosure, that any number of hardware devices 102, aggregation modules 104, data networks 106, third-party service providers 108, and/or backend servers 110 may be included in the system 100 for distributed data aggregation.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third-party service providers 108 and/or one or more backend servers 110 via a data network 106, described below. The hardware devices 102, in a further embodiment, are capable of executing various programs, program code, applications, instructions, functions, or the like.

In one embodiment, an aggregation module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party service providers 108. The aggregation module 104, in certain embodiments, accesses a server 108 of a third-party service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third-party service provider 108 (e.g., stored by hardware not owned, maintained, and/or controlled by the user). The aggregation module 104, in various embodiments, may provide the downloaded data to the user locally (e.g., displaying the data on an electronic display of a hardware device 102); may provide the downloaded data from the hardware device 102 of the user to and/or package the data for a remote server 110 (e.g., a backend aggregation module 104*b*) or other remote device (e.g., another hardware device 102 of the user, a hardware device 102 of a different user, or the like) which may be unaffiliated with the third-party service provider 108; may provide one or more alerts, messages, advertisements, or other communications to the user (e.g., on a hardware device 102) based on the downloaded data; or the like.

In certain embodiments, the system 100 includes a plurality of aggregation modules 104 disposed/located on hardware devices 102 of a plurality of different users (e.g., comprising hardware of and/or executable code running on one or more hardware devices 102). The plurality of aggregation modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a third-party service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many aggregation modules 104, in certain embodiments, may be much more difficult for a third-party service provider 108 to block.

In one embodiment, a hardware device 102 may include and/or execute an internet browser, which a user may use to access a server 108 of a third-party service provider 108 (e.g., by loading a webpage of the third-party service provider 108 in the internet browser). At least a portion of an aggregation module 104, in certain embodiments, may comprise a plugin to and/or an extension of an internet browser of a user's personal hardware device 102, so that a third-party service provider 108 may not block the aggregation module 104 from accessing the server 108 of the third-party service provider 108 without also blocking the user's own access to the server 108 using the internet browser. For example, the aggregation module 104 may use the same cookies, IP address, saved credentials, or the like as a user would when accessing a server 108 of a third-party service provider 108 through the internet browser. In certain embodiments, the aggregation module 104 may support integration with multiple different types of internet browsers (e.g., on different hardware devices 102).

An aggregation module 104, in certain embodiments, may mimic or copy a user's behavioral pattern in accessing a server 108 of a third-party service provider 108, to reduce a likelihood that the third-party service provider 108 may distinguish access to the server 108 by an aggregation module 104 from access to the server 108 by a user. For example, an aggregation module 104 may visit one or more locations (e.g., webpages) of a server 108 of a third-party service provider 108, even if the aggregation module 104 does not intend to download data from each of the one or more locations, may wait for a certain delay time between accessing different locations, may use a certain scroll pattern, or the like, to mask the aggregation module 104's downloading and/or aggregating of a user's data, to reduce the chances of being detected and/or blocked by the third-party service provider 108.

In one embodiment, at least a portion of an aggregation module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the aggregation module 104 downloads from a server 108 of a third-party service provider 108.

In one embodiment, the aggregation modules 104*a* comprise a distributed system 100, with the aggregation modules 104*a* and/or the associated hardware devices 102 downloading and/or aggregating data substantially independently (e.g., downloading data concurrently or non-concurrently, without a global clock, with independent success and/or failure of components). Distributed aggregation modules 104*a* may pass messages to each other and/or to a backend aggregation module 104*b*, to coordinate their distributed aggregation of data for users. In one embodiment, the aggregation modules 104*a* are decentralized (e.g., hardware devices 102 associated with users perform one or more aggregation functions such as downloading data), rather than relying exclusively on a centralized server or other device to perform one or more aggregation functions.

In a distributed and/or decentralized system 100, a central entity, such as a backend aggregation module 104*b* and/or a backend server 110, in certain embodiments, may still provide, to one or more aggregation modules 104*a*, one or more messages comprising instructions for accessing a server 108 of a third-party service provider 108 using a user's credentials, or the like. For example, a backend aggregation module 104*b* may provide one or more aggregation modules 104*a* of one or more hardware devices 102 with one or more sets of instructions for accessing a server 108 of a third-party service 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), and/or other instructions or information, using which the aggregation modules 104a may access and download a user's data.

In a further embodiment, one or more aggregation modules 104a may pass messages to each other, such as instructions for accessing a server 108 of a third-party service provider 108 using a user's credentials, or the like, in a peer-to-peer manner. In another embodiment, a central entity, such as a backend aggregation module 104b, may initially seed one or more sets of instructions for accessing a server 108 of a third-party service provider 108 using a user's credentials to one or more aggregation modules 104a, and the one or more aggregation modules 104a may send the one or more sets of instructions to other aggregation modules 104a.

Instructions for accessing a user's data, however, in certain embodiments, may change over time, may vary for different users of a third-party service provider 108, or the like (e.g., due to upgrades, different service levels or servers 108 for different users, acquisitions and/or consolidation of different third-party service providers 108, or the like), causing certain instructions to fail over time and/or for certain users, preventing an aggregation module 104 from accessing and downloading a user's data. A backend aggregation module 104b, in one embodiment, may provide one or more aggregation modules 104a with a hierarchical list of multiple sets of instructions, known to have enabled access to a user's data from a server 108 of a third-party service provider 108. An aggregation module 104a on a hardware device 102 may try different sets of instructions in hierarchical order, until the aggregation module 104a is able to access a user's data.

An aggregation module 104, in certain embodiments, may provide an interface to a user allowing the user to repair or fix failed instructions for accessing the user's data, by graphically identify an input location for the user's electronic credentials, an instruction for submitting a user's electronic credentials, a location of data associated with the user, or the like. An aggregation module 104, in one embodiment, may highlight or otherwise suggest (e.g., bold, color, depict a visual comment or label, or the like) an estimate which the aggregation module 104 has determined of an input location for the user's electronic credentials, an instruction for submitting a user's electronic credentials, a location of data associated with the user, or the like. For example, an aggregation module 104 may process a web page of a server 108 of a third-party service provider 108 (e.g., parse and/or search a hypertext markup language (HTML) file) to estimate an input location for the user's electronic credentials, an instruction for submitting a user's electronic credentials, a location of data associated with the user, or the like.

An aggregation module 104, in certain embodiments, may provide an advanced interface for a user to graphically repair broken and/or failed instructions for accessing a user's data from a server 108 of a third-party service provider 108, which allows a user to view code of a webpage (e.g., HTML or the like) and to identify an input location for the user's electronic credentials, an instruction for submitting a user's electronic credentials, a location of data associated with the user, or the like within the code of the webpage. In one embodiment, an aggregation module 104 may provide a basic interface for a user to graphically repair broken and/or failed instructions for accessing a user's data from a server 108 of a third-party service provider 108 by overlaying a basic interface over a web page or other location of the server 108 wherein the user may graphically identify an input location for the user's electronic credentials, an instruction for submitting a user's electronic credentials, a location of data associated with the user, or the like (e.g., without requiring the user to view HTML or other code of the web page). An aggregation module 104, in certain embodiments, may provide an interface that includes a selectable list of broken and/or missing instructions, locations, or the like, and may highlight and/or display suggestions graphically in response to a user selecting an item from the list.

An aggregation module 104, in one embodiment, may test instructions provided by users (e.g., using a test set) before allowing each of the aggregation modules 104a to use the provided instructions (e.g., to prevent an abusive user from providing false or incorrect instructions). An aggregation module 104 may score or rate users based on a success rate of the users' provided instructions, and may expedite (e.g., provide to a greater number of aggregation modules 104a and/or users) the use of instructions from users with a higher score or rating. The distributed network of aggregation modules 104, in certain embodiments, may thereby be self-healing and/or self-testing, allowing continued access to and/or aggregation of users' data from one or more third-party service providers 108, even if access instructions change or become broken.

The one or more aggregation modules 104, in certain embodiments, may provide an interface (e.g., an application programming interface (API)) to provide downloaded and/or aggregated user data from servers 108 of one or more third-party service providers 108 to one or more other entities (e.g., a remote server 110 or other hardware device 102 unaffiliated with the third-party service provider 108, a backend aggregation module 104b, or the like). The interface, in one embodiment, comprises a private interface between aggregation modules 104a of users' hardware devices 102 and one or more backend aggregation modules 104b. For example, this may enable a backend aggregation module 104b to provide a user with access to downloaded and/or aggregated user data at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded data from an aggregation module 104 to one or more other tools, services, and/or other entities to store, process, and/or otherwise use the data.

In various embodiments, an aggregation module 104 may be embodied as hardware, software, or some combination of hardware and software. In one embodiment, an aggregation module 104 may comprise executable program code stored on a non-transitory computer readable storage medium for execution on a processor of a hardware device 102, a backend server 110, or the like. For example, an aggregation module 104 may be embodied as executable program code executing on one or more of a hardware device 102, a backend server 110, a combination of one or more of the foregoing, or the like. In such an embodiment, the various modules that perform the operations of an aggregation module 104, as described below, may be located on a hardware device 102, a backend server 110, a combination of the two, and/or the like.

In various embodiments, an aggregation module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an aggregation module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an aggregation module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an aggregation module 104.

An aggregation module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an aggregation module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an aggregation module 104.

The semiconductor integrated circuit device or other hardware appliance of an aggregation module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an aggregation module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social media site, a photo sharing site, a video sharing site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more backend servers 110 and/or one or more backend aggregation modules 104b provide central management of the networked swarm of aggregation modules 104a. For example, the one or more backend aggregation modules 104b and/or a backend server 110 may store downloaded user data from the aggregation modules 104a centrally, may provide instructions for the aggregation modules 104a to access user data from one or more third-party service providers 108 using user credentials, or the like. A backend server 110 may include one or more servers located remotely from the hardware devices 102 and/or the one or more third-party service providers 108. A backend server 110 may include at least a portion of the modules or sub-modules described below with regard to the aggregation modules 104 of FIG. 2 and FIG. 3, may comprise hardware of an aggregation module 104, may store executable program code of an aggregation module 104 in one or more non-transitory computer readable storage media, and/or may otherwise perform one or more of the various operations of an aggregation module 104 described herein in order to aggregate user data from one or more third-party service providers in a distributed manner.

In certain embodiments, either in a distributed and/or decentralized manner from the hardware devices 102, or from a central location such as a backend server 110, an aggregation module 104 may comprise a permissions module 112 configured to provide an interface (e.g., a GUI, a CLI, an API, one or more web pages, a web-enabled application, or the like) to a user through a hardware device 102, allowing the user to manage multiple aggregators of the user's data (e.g., a backend server 110, one or more servers 108 of third-party service providers 108, and/or other entities), manage aggregation and/or data access permissions, or the like.

A permissions module 112 may display, to a user, a listing of multiple entities (e.g., third-party service providers 108) the user has authorized to download and/or aggregate the user's data (e.g., as clients of the backend server 110, or the like), what data the user has authorized the entities (e.g., third-party service providers 108) to download and/or aggregate, or the like. For example, in one embodiment, several third-party service providers 108 may comprise financial institutions or the like, the user may have authorized one third-party service provider 108 to aggregate data from one different financial institution (e.g., a different third-party service provider 108), and authorized another third-party service provider 108 to aggregate data from two or more other financial institutions (e.g. other third-party service providers 108), and a permissions module 112 may display each of the authorizations to the user, in a graphical user interface (GUI) or the like.

A permissions module 112 may provide an interface (e.g., a GUI) for a user to revoke and/or add an authorization for a third-party service provider 108 or other entity to aggregate the user's data (e.g., from a different one or more third-party service provider 108, or the like. A permissions module 112, in certain embodiments, may display, to a user, (e.g., in a GUI) whether the user's electronic credentials, provided to a third-party service provider 108 or other entity for aggregating the user's data or the like, are valid and/or up to date (e.g., by comparing the user's electronic credentials from the aggregation module 104 to electronic credentials provided to a third-party service provider 108 or other entity, based on an error message from a third-party service provider 108 or other entity, by attempting to log into a third-party service provider 108 using the electronic credentials, or the like). In one embodiment, a permissions module 112 may provide an interface for a user to update and/or correct electronic credentials provided to one or more third-party service providers 108 for aggregating the user's data and may provide the updated electronic credentials to the third-party service provider 108 or other entity, may download or otherwise aggregate data for the user using the updated electronic credentials on behalf of the third-party service provider 108 or other entity, or the like.

In this manner, in certain embodiments, a permissions module 112 may allow a user to see how many different entities (e.g., third-party service providers 108) have access to one or more of the user's accounts, which entities (e.g., third-party service providers 108) have valid and/or up to date electronic credentials, selectively update electronic credentials for one or more entities (e.g., third-party service providers 108), revoke/cancel authorization for an entity (e.g., third-party service provider 108) to access one or more of the user's accounts (e.g., to download and/or aggregate data from an account for the user), or the like, in a single location, using a single portal or tool. In one embodiment, a permissions module 112 may comprise an interface (e.g., an API or the like) with one or more different aggregation modules 104 or the like (e.g., associated with different backend servers 110, different third-party service providers 108, or the like), allowing the permissions module 112 to provide an interface for a user to manage aggregation and/or authorizations for the one or more different aggregation modules 104 as well.

In response to a third-party service provider 108 requesting access to at least a portion of a user's data downloaded and/or stored by an aggregation module 104, a permissions module 112 may display, to a user (e.g., as a pop-up window or other user interface element, in a GUI or the like) an interface for granting, denying, and/or altering the third-party service provider 108's request. In certain embodiments, a permissions module 112 may provide a user with fine grained controls over access to data downloaded and/or stored by an aggregation module 104. For example, in one embodiment, a permissions module 112 may allow a user to individually grant, revoke, and/or adjust access permissions for data from different third-party service providers 108 to other third-party service providers 108, for different data elements from certain third-party service providers 108 (e.g., certain columns, certain rows, account numbers, transactions, amounts, descriptions, interest rates, photos, posts, likes, friends, and/or other distinguishable data elements), for different data types, or the like.

In this manner, in some embodiments, a permissions module 112 may provide an interface (e.g., a GUI) for a user to grant and/or deny access rights for one third-party service provider 108 to access an interest rate from a mortgage lender third-party service provider 108 but not a loan amount, to access names of parties to a transaction (e.g., merchant and/or vendor names) but not transaction amounts from a bank account with a different third-party service provider 108, and may grant another third-party service provider 108 access rights to all of the user's aggregated data, or the like. In some embodiments, a permissions module 112 may allow a user to allow/grant, deny, and/or revoke access of one or more third-party service providers 108 to data downloaded from one or more other third-party service providers 108.

A permissions module 112, in certain embodiments, may comprise a central, trusted intermediary or other entity, through which a user may manage all permissions for the user's data downloaded and/or aggregated from one or more third-party service providers 108 (e.g., on behalf of the user for one or more other third-party service providers 108), allowing the user to dynamically manage and adjust (e.g., using a GUI), which third-party service providers 108 have access to which portions of data aggregated from which other third-party service providers 108.

In one embodiment, a permissions module 112 blocks a third-party service provider 108 from accessing or even verifying the existence of data for which a user has not granted the third-party service provider 108 access. A permissions module 112, in some embodiments, may provide an interface for a user to update a username, electronic credentials, security questions, and/or other security settings for multiple third-party service providers 108, through a single, central, trusted location (e.g., in a GUI or the like from a permissions module 112). As described below with regard to the password manager module 306, in certain embodiments, a permissions module 112 and/or an aggregation module 104 (e.g., in cooperation with the password manager module 306) may manage and/or set electronic credentials for a plurality of third-party service providers 108 for a user (e.g., so that the user does not have to know and/or remember multiple passwords, in order to generate more secure electronic credentials, or the like).

A permissions module 112, in certain embodiments, may monitor electronic credentials of users (e.g., comparing usernames used with the same third-party service provider 108, or the like) used to download and/or aggregate the users' data (e.g., in order to optimize the downloading of data, avoid and/or minimize the repeated download of the same data, or the like). For example, a permissions module 112 may detect similar electronic credentials (e.g., the same username, such as an email address or other unique username) of a user for the same third-party service provider 108 being used to download data for multiple other third-party service providers 108 (e.g., the multiple other third-party service providers 108 may each be clients of the backend server 110 and may have each requested aggregation of the same data for the same user from the user's account with the same third-party service provider 108, or the like). In one embodiment, a permissions module 112 may provide an interface (e.g., a GUI) where a user may provide electronic credentials for a third-party service provider 108, and the permissions module 112 may determine whether the electronic credentials are being used by any other third-party service providers 108 to download and/or aggregate data from the third-party service provider 108, or the like.

A permissions module 112, in some embodiments, may determine that electronic credentials are similar if a username (e.g., a unique identifier, an email address, or the like) is the same (e.g., identical) even if the associated passwords, fingerprints, face identifiers, or other electronic credentials are different. For example, there may be different passwords associated with the same account, different third-party service providers 108 may be using passwords for the same account from different time periods (e.g., an old and/or expired password), or the like, but the accounts may be the same if the usernames are the same.

If the same data for the same user is downloaded or otherwise accessed from the same third-party service provider 108 multiple times, from different hardware devices 102, 110 or the like, during different sessions with different session identities (e.g., internet protocol (IP) addresses, user agent strings, browser cookies, or the like) the third-party service provider 108 may require repeated verification (e.g., multiple one-time passwords, repeated multifactor authentication, or the like), may logout or block certain downloads, or the like. A permissions module 112, in certain embodiments, in response to detecting that the same account is being accessed for multiple third-party service providers 108 (e.g., detecting a similar username or other electronic credential is being used), may share the same data (e.g., downloaded by the same hardware computing device 102, 110 from the same third-party service provider 108 with the same or similar electronic credentials using a same session identity, or the like) with each of the multiple third-party service providers 108 requesting the data, instead of downloading the data repeatedly.

A session identity, in one embodiment, may include an internet protocol (IP) address to which data is downloaded (e.g., an IP address of a physical and/or virtual computing device 102, 110 downloading the data). A session identity, in a further embodiment, includes a user agent string (e.g., provided to the third-party service provider 108 from a physical and/or virtual computing device 102, 110 downloading the data). A user agent string may identify a browser, an operating system, a hardware device, a client identity, a client version, a rendering engine, a compatibility, and/or other identity information for a session identity. A session identity, in some embodiments, includes one or more browser cookies (e.g., metadata from a third-party service provider 110 stored on the hardware computing device 102, 110 downloading the data, such as a hypertext transfer protocol (HTTP) cookie, a web cookie, an internet cookie, an authentication cookie, a session cookie, a persistent cookie, a third-party tracking cookie, or the like).

By using and/or maintaining one or more of the same IP address, user agent string, browser cookies, or the like to download data for a user from a third-party service provider 110, even if the data is being downloaded for multiple other third-party service providers 110, in certain embodiments, a permissions module 112 may reduce the authentication overhead of downloading the data, may reduce the load on the third-party service provider 110, may provide more consistent data to the user (e.g., accessing the same aggregated data through the multiple other third-party service providers 110), and/or may reduce a chance that the third-party service provider 110 will block access to the user's data.

In some embodiments, even if one or more aggregation modules 104 are downloading the data at different times and/or from different hardware computing devices 102, 110, a permissions module 112 may use the same session identity (e.g., copying, cloning, and/or spoofing an IP address, a user agent string, a browser, an operating system, a hardware device, a cookie, or the like to maintain the same session identity) over time to download data from the same third-party service provider 108. A permissions module 112, in certain embodiments, may even maintain the same session identity for downloading data from a third-party service provider 108 when one of multiple third-party service providers 108 sharing the data removes the user (e.g., stops and/or ceases using the data, requesting the data or the like; requests that the permissions module 112 deletes and/or removes the user; or the like). In this manner, in response to the third-party service provider 108 later re-adding the user, the permissions module 112 may continue to use the same session identity, and can begin sharing the same data downloaded from the same third-party service provider 108 with the same electronic credentials again, so that continuity is not lost.

Although a permissions module 112 may allow multiple third-party service providers 108 to share and/or otherwise use the same data, in some embodiments, the multiple third-party service providers 108 may maintain their own, different metadata for the same data. For example, if the multiple third third-party service providers 108 comprise financial institutions, financial technology providers, or the like that are each aggregating a user's financial transaction data from one or more of the same third-party service providers 108 (e.g., other financial institutions or the like), each of the multiple third-party service providers 108 may receive the same financial transaction data for the user, but may maintain separate metadata (e.g., categories for transactions, budgets, financial goals, or the like) for the same data. In some embodiments, different members of a household, family members, or the like may share an account (e.g., a joint financial account or the like) and may each set their own preferences, categories, budgets, financial goals, or the like, which the different third-party service providers 108 may maintain as separate metadata.

A permissions module 112, in one embodiment, may be configured to clone, duplicate, and/or copy a session identity in response to a user changing and/or updating a password or other electronic credential with one of the third-party service providers 108 that is accessing data for the user from another third-party service provider (e.g., maintaining the original session identity using the previous password and/or other electronic credential and the cloned session identity with the new password). If the permissions module 112 determines that login is successful using the new password (e.g., that the user's data may be accessed and/or downloaded using the new password), in some embodiments, the permissions module 112 may prompt the user for the changed password through a GUI of one or more of the other third-party service providers 108 accessing the downloaded data (e.g., in order to obtain the user's permission to use the new password for the other third-party service providers 108), may prompt the user for authorization to use the new password with other third-party service providers 108, or the like. In response to the login using the new password failing or being unsuccessful (e.g., failing to download the user's data using the new password), the permissions module 112 may prompt the user for the previous password, for authorization to use the previous password, or the like through a GUI of the third-party service provider 108 through which the user provided the new password, may revert from the cloned session identity to the original session identity, or the like.

Figure 2:
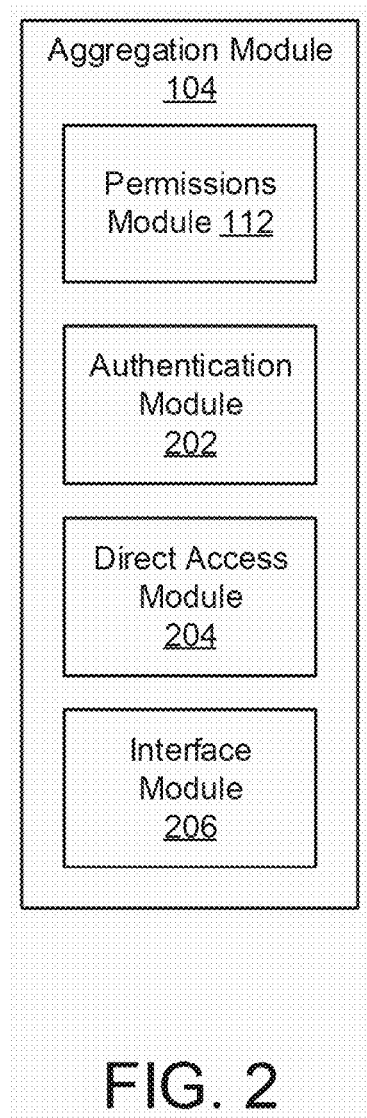
FIG. 2 is a schematic block diagram of one embodiment of an aggregation module.

FIG. 2 depicts one embodiment of an aggregation module 104. In the depicted embodiment, the aggregation module 104 includes a permissions module 112, an authentication module 202, a direct access module 204, and an interface module 206. The permissions module 112, in certain embodiments, may be substantially similar to the permissions module 112 described above with regard to FIG. 1.

In one embodiment, the authentication module 202 receives a user's electronic credentials for a third-party service provider 108 from the user on a hardware device 102 of the user. In a further embodiment, the authentication module 202 may receive electronic credentials for a different user (e.g., from a different hardware device 102, from a backend aggregation module 104, or the like), which may be encrypted and/or otherwise secured, so that the direct access module 204 may download data for the different user (e.g., downloading data for multiple users from a single user's hardware device 102).

For example, in the distributed/decentralized system 100, if one user's hardware device 102 is turned off, asleep, out of battery, blocked by a third-party service provider 108, or the like, in certain embodiments, an aggregation module 202 on a different user's hardware device 102 and/or on a backend server 110 may download data for the one user, using the one user's electronic credentials, and may send the data to the one user's hardware device 102, may send an alert and/or push notification to the one user's hardware device 102, or the like. In this manner, in one embodiment, a user may continue to aggregate data, receive alerts and/or push notifications, or the like, even if the user's own hardware device 102 is blocked, unavailable, or the like. In cooperation with one or more authentication modules 202, the aggregation modules 104a, 104b, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where an aggregation module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware device 102 (e.g., encrypting data in RAM, NAND, and/or other general purpose storage) with or without dedicated security hardware. In certain embodiments, the authentication module 202 may encrypt and/or secure data (e.g., electronic credentials, downloaded data) associated with a first user that is received by, processed by, and/or stored by a second (e.g., different) user's hardware device 102 (e.g., from the first user's hardware device 102 over the data network 106 or the like), preventing the second user from accessing the first user's data while still allowing the first user's data to be downloaded and/or aggregated from a different user's hardware device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different third-party service providers 108 (e.g., different social networks, different photo sharing sites, different financial institutions) so that the aggregation module 104 may download, aggregate, and/or combine the user's data from the multiple different third-party service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more third-party service providers 108. For example, in certain embodiments, the authentication module 202 may receive an initial set of electronic credentials (e.g., a username and a password) from a user for an account of the user with a third-party service provider 108, and the authentication module 202 may use the initial set of electronic credentials to access the user's account with the third-party service provider 108 to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more third-party service providers 108, from a hardware device 102 of a user and/or from a backend server 110, using a user's electronic credentials from the authentication module 202 (e.g., for the user associated with the hardware device 102, for a different user, or the like). The direct access module 204, in certain embodiments, downloads data associated with a user (e.g., a user's social media posts, a user's photos, a user's financial transactions, or the like) from one or more servers 108 of one or more third-party service providers 108 to a hardware device 102 of a user (e.g., of the user associated with the downloaded data, of a different user for processing and/or for transfer to the hardware device 102 of the user associated with the downloaded data, or the like) and/or to a backend server 110 associated with the direct access module 204, instead of or in addition to downloading the data directly to a hardware device 102 of the user (e.g., based on an availability of the hardware device 102 of the user, to backup the data in a second location, or the like).

The direct access module 204, in certain embodiments, may use a webpage interface of a server 108 of a third-party service provider 108 to access the server 108 using a user's electronic credentials and/or to download data associated with the user. For example, in certain embodiments, the direct access module 204 may download/load a webpage from a server 108 of a third-party service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a third-party service provider 108 with a user's electronic credentials, the direct access module 204 may download data associated with the user (e.g., from a user's account or the like) from the server 108, to a hardware device 102 associated with the user, to a backend server 110, to a hardware device 102 of another user downloading the data in proxy for the user, or the like. As described below, in certain embodiments, the pattern module 308 may receive and/or provide instructions enabling the direct access module 204 to download data associated with a user from a server 108 of a third-party service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, the direct access module 204 sends or otherwise submits electronic credentials and/or receives or otherwise downloads data using an API or other access protocol of a server 108 of a third-party service provider 108. For example, the direct access module 204 may send a request in a format specified by and/or compatible with a server 108 (e.g., an API server 108) of a third-party service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or the direct access module 204 may use a different access protocol of a server 108.

In response to a request for data from the direct access module 204 (e.g., in response to the direct access module 204 authenticating a user using an access protocol of a server 108), a server 108 of a third-party service provider 108 may send and/or return data associated with a user (e.g., in one or more messages, packets, payloads, as a URL or other pointer to a location from where the direct access module 204 may retrieve the data, or the like). The direct access module 204, in various embodiments, may receive data associated with a user directly from a server 108 of a third-party service provider 108 over a data network 106; may receive a pointer, URL or other link to a location of data associated with a user from a server 108 of a third-party service provider 108; may receive data associated with a user from another entity on a data network 106 (e.g., in response to a request from the server 108 of the third-party service provider 108 to the other entity or the like); or may otherwise receive data associated with a user according to an access protocol of a third-party service provider 108.

In one embodiment, a third-party service provider 108 provides a direct access module 204 with an API or other access protocol. In a further embodiment, a direct access module 204 may act as a wrapper for and/or a plugin or extension of, an application of a third-party service provider 108 (e.g., a mobile application), and the application may have access to an API or other access protocol of the third-party service provider 108. In another embodiment, a direct access module 204 may be configured to use an API or other access protocol in a same manner as an application of a third-party service provider 108 (e.g., a mobile application), through observation of the application of the third-party service provider 108 or the like. In certain embodiments, a direct access module 204 may cooperate with an application of a third-party service provider 108, a web browser through which a user accesses services of a third-party service provider 108, or the like to access data associated with a user (e.g., accessing data already downloaded by an application and/or user, accessing a database or other data store of an application and/or web browser, scanning and/or screen scraping a web page of a third-party service provider 108 as a user accesses the web page, or the like).

The direct access module 204, in certain embodiments, may access different third-party service providers 108 in different manners. For example, a first third-party service provider 108 may grant the direct access module 204 with access to an API or other access protocol, while the direct access module 204 may use a web page interface (e.g., screen scraping) to access and download data from a second third-party service provider 108, or the like. In one embodiment, a remote backend server 110 may be associated with a first party service provider 110 (e.g., a vendor and/or provider of an aggregation module 104) and the direct access module 204 may download data associated with a user from both the first party service provider 110 and from one or more third-party service providers 108, aggregating the data together so that the user may access the data in a single interface and/or application. For example, as described below with regard to the interface module 206, the interface module 206 may provide a user access to the user's photos from multiple third-party cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more third-party service providers 108. For example, the direct access module 204 may store a user's downloaded and/or aggregated data on a hardware device 102 of the user, on a backend server 110 accessible by the user, or the like. In this manner, in certain embodiments, a user may control and/or access the user's data, even if a third-party service provider 108 closes down or is not available, may use the user's data in any manner desired by the user even if the use is not supported by a third-party service provider 108, or the like.

The direct access module 204, in one embodiment, in addition to and/or instead of downloading data from one or more third-party service providers 108, may upload data to and/or change one or more settings of one or more third-party service providers 108, in response to user input or the like. For example, in embodiments where the data comprises photos, the direct access module 204 may upload a photo from a hardware device 102 of the user to one or more third-party service providers 110 (e.g., a downloaded photo that the user has edited on the hardware device 102 or the like). In embodiments where the data comprises social media posts or other content, the direct access module 204 may receive input from a user (e.g., a photo, a textual post, one or more emoji, a video, a document or other file, or the like) and upload the received input to one or more third-party service providers 108 (e.g., social media sites or the like). In embodiments where the data comprises financial transactions or other financial data, the direct access module 204 may schedule a bill pay or other payment or funds transfer, remotely deposit a check (e.g., by uploading photos of the front and/or back of the check, or the like), and/or perform another action.

The direct access module 204 may update or change a user's account information with a third-party service provider 108, such as an account type or plan, credit card or other payment information associated with an account, a phone number or address or other contact information associated with an account, a password or other electronic credentials for an account, and/or other account information of a user for a third-party service provider 108. The direct access module 204 may update and/or upload data in a substantially similar manner to that described herein for downloading data (e.g., determining a user's electronic credentials for a third-party service provider 108, accessing a server 108 of the third-party service provider 108, uploading and/or providing data to the third-party service provider 108, or the like).

In one embodiment, the interface module 206 provides a user's data downloaded by the direct access module 204, from a hardware device 102 of a user (e.g., of the user associated with the downloaded data, of a different user) to another entity, such as a hardware device 102 of a user associated with the downloaded data (e.g., in response to the data being downloaded by a hardware device 102 of a different user, from one hardware device 102 of a user to another hardware device 102 of the same user), a remote server 110 or other remote device 102 unaffiliated with (e.g., not owned by, operated by, controlled by, or the like) the third-party service provider 108 from which the data was downloaded, or the like. For example, the interface module 206 may provide an API or other interface to provide a user's downloaded and/or aggregated data to a hardware device 102 of the user, to a backend aggregation module 104b, to a backend server 110, to a different third-party service provider 108, to a different/second hardware device 102 of the user, or the like.

In certain embodiments, it may be transparent and/or substantially transparent to a user (e.g., not apparent) which hardware device 102, 110 has downloaded data associated with the user. For example, the interface module 206 may provide downloaded data associated with a user from one hardware device 102 of the user to another hardware device 102 of the user, from a hardware device 102 of the user to a backend server 110 (e.g., from which the user may access the data using a web browser, an application, or the like), from a backend server 110 to a hardware device 102 of the user, or the like, allowing the user to access the data from a different location than the location to which the data was downloaded.

In certain embodiments, the interface module 206 provides a graphical user interface (GUI) on a hardware device 102 of a user, and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware device 102 to which the data was downloaded, on a different hardware device 102 than the hardware device 102, 110 to which the data was downloaded, or the like.

For example, in one embodiment, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the interface module 206 may provide a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 108, from different contacts or friends of the user, or the like).

The interface module 206, in certain embodiments, may provide one or more access controls to a user, allowing the user to define which devices 102, users, third-party service providers 110, or the like may access which data. For example, the interface module 206 may provide an interface for a user to allow and/or restrict certain mobile applications, certain APIs for third-party services, certain plugins or extensions, certain users, certain hardware devices 102, and/or one or more other entities to access data downloaded for the user from one or more third-party service providers 108 (e.g., with access controls by third-party service provider 108 or other data source, by data type, by entity requesting access, and/or at another granularity). In this manner, the aggregation module 104, in certain embodiments, may comprise a local repository of aggregated data, which one or more other devices 102 and/or services may access and use, with a user's permission.

Figure 3:
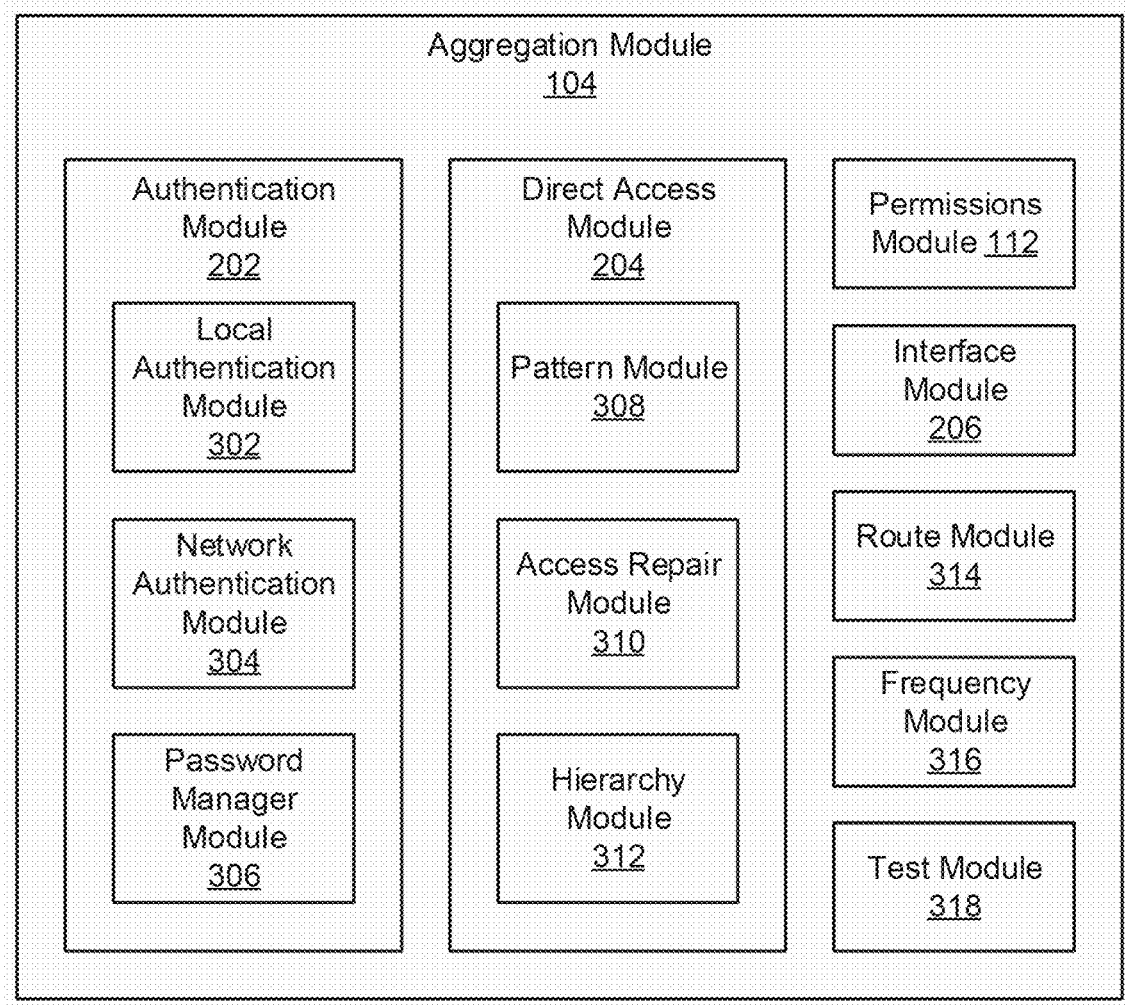
FIG. 3 is a schematic block diagram of another embodiment of an aggregation module.

FIG. 3 depicts another embodiment of an aggregation module 104. In the depicted embodiment, the aggregation module 104 includes a permissions module 112, an authentication module 202, a direct access module 204, and an interface module 206 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware device 102, transferred to and/or from a user's hardware device 102, or the like. For example, the local authentication module 302 may cooperate with one or more security and/or authentication systems of the user's hardware device 102, such as a PIN, password, fingerprint authentication, facial recognition, or other electronic credentials used by the user to gain access to the hardware device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the aggregation module 104, for a user, and may authenticate the user in response to the user accessing an application and/or service of the aggregation module 104.

In certain embodiments, the local authentication module 302 may encrypt and/or otherwise secure, on a user's hardware device 102, electronic credentials and/or downloaded data associated with a different user, so that the user may not access data associated with the different user, but the different user may access the data once it is transmitted to a hardware device 102 of the different user, to a backend server 110, or the like. Local authentication modules 302 of different hardware devices 102, 110 may cooperate to securely transfer data (e.g., one or more electronic credentials, downloaded data, or the like) over the data network 106, from one hardware device 102, 110 to another hardware device 102, 110. In a further embodiment, the local authentication module 302 may ensure that a user's electronic credentials and/or downloaded data remain on a single hardware device 102 (e.g., are not transmitted on a data network 106), in a secure repository or the like, and are not stored on and/or accessible to a backend server 110, a hardware device 102 of another user, or the like.

In one embodiment, the network authentication module 304 receives and/or stores a user's electronic credentials for one or more third-party service providers 108 on a hardware device 102 of the user, on a backend server 110, or the like. The network authentication module 304, in various embodiments, may receive a user's electronic credentials from the user, from a hardware device 102 of the user, from a backend server 110, or the like. The network authentication module 304 may cooperate with the direct access module 204 to provide a user's electronic credentials to a server 108 of a third-party service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more third-party service providers 108, on a hardware device 102 of a user, on a data network 106, on a hardware device 102 of a different user, on a backend server 110, while being provided to a server 108 of a third-party service provider 108, or the like. In a further embodiment, the network authentication module 304 ensures that a user's electronic credentials are only stored on a user's hardware device 102 and sent from the user's hardware device 102 to a server 108 of a third-party service provider 108, and does not store a user's electronic credentials on a backend server 110, on a different user's hardware device 102, or the like. In another embodiment, the network authentication module 304 may securely store (e.g., using secure encryption) a user's electronic credentials for a third-party service provider 108 on a backend server 110, on a different user's hardware device 102, or the like, so that a direct access module 204 may access and/or download data associated with the user, even if the hardware device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware device 102, a backend server 110, or the like may be based on a setting defined based on user input, so that the user may decide a level of security, or the like.

In one embodiment, the password manager module 306 may manage and/or store electronic credentials of a user for a plurality of third-party service providers 108, so that the direct access module 204 may access and/or download data associated with the user from each of the plurality of third-party service providers 108. The password manager module 306, in certain embodiments, may generate and/or otherwise manage different, secure, credentials for each of a plurality of third-party service providers 108.

The password manager module 306, in one embodiment, may securely store generated credentials for a user on a hardware device 102 of the user, so that the user does not have to remember and enter the generated electronic credentials. For example, in addition to allowing a direct access module 204 to access a third-party service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third-party service provider 108 with the regenerated different credentials) electronic credentials for a user, such as every week, every month, every two months, every three months, every four months, every five months, every six months, every year, every two years, in response to a user request, in response to a request from a third-party service provider 108, and/or over another time period or in response to another periodic trigger.

The password manager module 306, in one embodiment, may synchronize a user's electronic credentials (e.g., provided by the user, generated by the password manager module 306, or the like) across different hardware devices 102, web browsers, or the like of a user. For example, in response to a password manager module 306 and/or the user updating or otherwise changing electronic credentials, the password manager module 306 may propagate the update/change to one or more other password manager modules 306, on different hardware devices 102 of the user, or the like.

In one embodiment, the pattern module 308 determines an ordered list (e.g., a pattern, a script, or the like) of multiple locations on one or more servers 108 of a third-party service provider 108 for the direct access module 204 to access the server (e.g., which may include locations other than where the data of the user is stored and/or accessible), one or more delays for the direct access module 204 to wait between accessing locations on the server 108, and/or other components of an access pattern for accessing data of a server. Locations, in certain embodiments, comprise independently addressable and/or accessible content and/or assets provided by one or more servers of a third-party service provider 108, or the like, such as webpages, portions of a webpage, images or other data files, databases or other data stores, pages or sections of a mobile application, or the like. The pattern module 308, in one embodiment, determines a pattern/ordered list that contains one or more locations and/or delays that are not necessary for the direct access module 204 to access or use in order to download desired data, but instead, the pattern/ordered list may make it difficult or impossible for the third-party service provider 108 to distinguish between the direct access module 204 accessing a server of the third-party service provider 108 and a user accessing the server of the third-party service provider.

The pattern module 308, in one embodiment, may determine and/or select the multiple locations and/or the one or more delays (e.g., a pattern/ordered list) based on an average pattern or a combined pattern identified in or based on behavior of multiple users accessing a third-party service provider 108 using a web browser, a mobile application, or the like. The pattern module 308, in one embodiment, may monitor one or more users (e.g., for a predetermined period of time or the like) as they access a server of a third-party service provider 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the direct access module 204 to use to access a server of a third-party service provider 108.

In a further embodiment, the pattern module 308 determines and/or selects multiple locations and/or one or more delays between accessing different locations based on a pattern identified in behavior of the user associated with the hardware device 102 on which the pattern module 308 is disposed, accessing the third-party service using a web browser, a mobile or desktop application, or other interface of the user's hardware device 102. For example, the pattern module 308 may comprise network hardware of the user's hardware device 102 (e.g., a network access card and/or chip, a processor, an FPGA, an ASIC, or the like in communication with the data network 106 to monitor data and/or interactions with a server of a third-party service provider 108), a web browser plugin or extension, a mobile and/or desktop application executing on a processor of the user's hardware device 102, or the like. The pattern module 308 may request and receive authorization from the user to monitor the user's activity with regard to one or more servers of one or more third-party service providers 108 from the user's hardware device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a third-party service provider 108 and/or data associated with a user becoming broken and/or inaccessible.

In one embodiment, the access repair module 310 detects that access to a server 108 of a third-party service 108 and/or data associated with a user is broken and/or becomes inaccessible. The access repair module 310, in certain embodiments, provides an interface to a user allowing the user to graphically identify an input location for the user's electronic credentials, a location of data associated with the user, or the like. For example, the access repair module 310 may provide a GUI, a command line interface (CLI), an API, and/or another interface allowing an end user to identify an input location for electronic credentials, an action for submitting electronic credentials, a location of data, or the like. The access repair module 310, in one embodiment, provides an interface to a user on a hardware device 102 of the user.

In certain embodiments, for example, the access repair module 310 may overlay an interface over one or more pages of a website of a third-party service provider 108 on an electronic display screen of a user's hardware device 102, as described in greater detail below with regard to FIGS. 5A-5B. The access repair module 310 may provide one or more interfaces (e.g., GUIs, CLIs, APIs, overlays, or the like) to multiple users, allowing multiple users to define a repair and/or update for access to a server of a third-party service provider 108 (e.g., in a distributed and/or decentralized manner, from different hardware devices 102 or the like over a network 106).

The access repair module 310, in certain embodiments, may determine and/or display one or more suggestions 504 and/or recommendations 504 for the user, which the user may either confirm or change/correct (e.g., in a basic interface, a standard interface, a beginning user interface, or the like). For example, the access repair module 310 may display one or more interface elements with a suggested location for a user to enter a user name, a suggested location for a user to enter a password, a suggested credential submit action, a suggested location of data associated with the user, and/or one or more other interface elements allowing a user to graphically identify one or more locations within a website of a third-party service provider 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a website, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like).

The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the test module 318 cooperates with the access repair module 310 to verify whether or not one or more received locations and/or instructions from a user are accurate (e.g., usable to access data from a server of a third-party service provider 108). The test module 318, in certain embodiments, attempts to access a server 108 of a third-party service provider 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a third-party service provider 108 using identifications which the access repair module 310 received from different users (e.g., on different hardware devices 102 and sent to the test module 318 on a single hardware device 102 over the data network 106, sent to multiple test modules 318 on different hardware devices 102 over the data network 106, sent to a test module 318 on a central backend server 110, or the like).

The test module 318, in one embodiment, provides one or more identifications from a user to other instances of the direct access module 204 (e.g., other test modules 318) for accessing a server 108 of a third-party service provider 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a third-party service provider 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a third-party service provider 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a third-party service provider 108, as described in greater detail below with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more aggregation modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more aggregation modules 104 and their aggregation services to be self healing, self testing, and/or self incrementally deploying, as it tests and uses the most effective solutions, or the like (e.g., sets of instructions based on indications from one or more users).

In one embodiment, the hierarchy module 312 provides the direct access module 204 with an ordered list of multiple different sets of instructions for accessing a server 108 of a third-party service provider 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend aggregation module 104b of a backend server 110), from another user hardware device 102 in a peer-to-peer manner (e.g., an aggregation module 104a of a user hardware device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware devices 102 of the user).

The direct access module 104, in one embodiment, may iterate through an ordered list of multiple sets of instructions for accessing a server 108 of a third-party service provider 108, in the order of the list, until one of the sets of instructions is successful and the direct access module 104 is able to access and/or download data from the third-party service provider 108. The hierarchy module 312, in one embodiment, may place a most recent successfully used set of instructions at the top (e.g., as the first set to try). For example, the hierarchy module 312 for a user's hardware device 102 may place a set of instructions for accessing a third-party service provider 108 at the top of a list (e.g., adjusting an order of the list over time) in response to the direct access module 204 successfully accessing and/or downloading data from the third-party service provider 108 using the set of instructions. In certain embodiments, the hierarchy module 312 may receive an ordered list of multiple different sets of instructions for accessing a server 108 of a third-party service provider 108 in a first order (e.g., a global order) and may dynamically adjust and/or rearrange the different sets of instructions over time based on a single user's/hardware device 102's use (e.g., moving a set of instructions up in the list if access using the set of instructions is successful for the user/hardware device 102, moving a set of instructions down in the list if access using the set of instructions is unsuccessful for the user/hardware device 102, or the like).

The hierarchy module 312, in certain embodiments, may be configured to share one or more sets of instructions, an ordered list of multiple sets of instructions, or the like with a hierarchy module 312 of another user's hardware device 102 over a data network 106 (e.g., directly to the other user's hardware device 102 in a peer-to-peer manner, indirectly by way of a backend aggregation module 104b of a backend server 110, or the like). Different sets of instructions may be successful or unsuccessful for different users, in various embodiments, due to different account types, different account settings, different originating systems (e.g., due to a corporate acquisition or the like, different users of the same third-party service provider 108 may have one or more different settings, different access methods, or the like), system changes or upgrades, and/or another difference in accounts, services, or the like for different users of the same third-party service provider 108.

In one embodiment, the route module 314 determines whether a hardware device 102 of a user is available for the direct access module 204 to download data associated with the user from a server 108 of a third-party service provider 108. The route module 314, in certain embodiments, may access a server 108 of a third-party service provider 108, from a remote backend server 110, using the user's electronic credentials, to download data associated with the user from the server 108 to the remote backend server 110 in response to the route module 314 determining that the hardware device 102 of the user is unavailable. The route module 314, in one embodiment, provides a user one or more alerts (e.g., downloaded data from a third-party service provider 108, a recommendation or suggestion determined based on data from a third-party service provider 108, a notification or other alert based on an event or other trigger detected in data from a third-party service provider 108, or the like) on a hardware device 102 of the user based on the data associated with the user downloaded to the remote backend server 110.

In certain embodiments, the route module 314 maintains and/or stores a list of multiple hardware devices 102 associated with a single user and/or account. In response to determining that one hardware device 102 associated with a user and/or account is unavailable (e.g., powered down, in airplane mode, not connected to the data network 106, or the like), the route module 314 may access a server 108 of a third-party service provider 108 from a different, available hardware device 102 of the user and/or account, may provide one or more notifications or other alerts on a different, available hardware device 102, or the like. The route module 314, in various embodiments as described below with regard to FIGS. 4A-4C, may dynamically route downloading of data for a user from a third-party service provider 108 between multiple hardware devices, such as one or more hardware devices 102 of the user, one or more hardware devices 102 of a different user, one or more backend servers 110, and/or another hardware device, in a secure manner.

The route module 314, in one embodiment, may alternate or rotate between multiple hardware devices 102, 110 (e.g., of the same user, of different users, or the like) for downloading data for the same user from a third-party service provider 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware device 102 of a user, a backend server 110, or the like), which may be authorized and/or identified by the third-party service provider 108 as a trusted device, or the like.

In one embodiment, the frequency module 316 sets a frequency with which the direct access module 204 accesses the server 108 of a third-party service provider 108. The frequency module 316, in certain embodiments, determines a frequency based on input from a remote backend server 110, which may be unaffiliated with the third-party service provider 108 being accessed, so that the remote backend server 110 (e.g., the frequency module 316 executing on the remote backend server 110) determines frequencies for a plurality of direct access modules 204 for different users and/or different hardware devices 102. For example, the frequency module 316 may limit a single user and/or hardware device 102 from accessing the same third-party service provider 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a third-party service provider 108, or the like.

The frequency module 316, in certain embodiments, may dynamically adjust a frequency with which a user and/or hardware device 102 may access a third-party service provider 108 over time. For example, the frequency module 316 may monitor access and/or downloads by multiple users (e.g., all users, available users, active users, or the like) to cap or limit a total access and/or download bandwidth for each of the different third-party service providers 108 (e.g., so as not to overwhelm any single third-party service provider 108, or the like). In this manner, in one embodiment, a user and/or hardware device 102 may access and/or download data with a higher frequency when fewer other users and/or hardware devices 102 are accessing and/or downloading data (e.g., low peak times), but may be limited to a lower cap or access frequency when more other users and/or hardware devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more third-party service providers 108 using one or more hardware devices 102 (e.g., providing different settings allowing the user to set different access frequencies for different third-party service providers 108, different hardware devices 102 of the user, or the like).

Figure 4A:
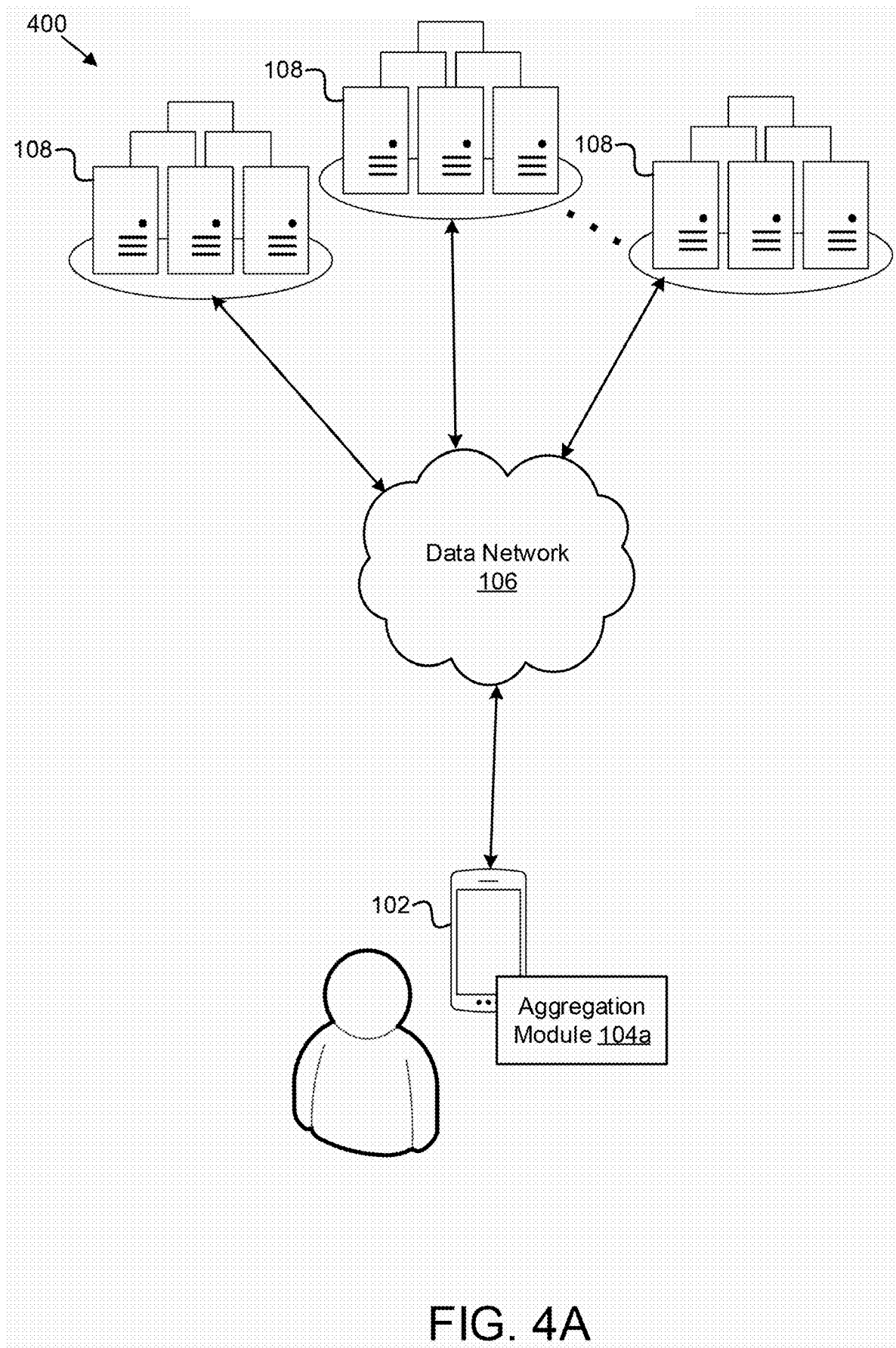
FIG. 4A is a schematic block diagram illustrating an additional embodiment of a system for aggregation platform permissions.

FIG. 4A depicts one embodiment of a system 400 for aggregation platform permissions. The system 400, in the depicted embodiment, includes a single user hardware device 102 with an aggregation module 104a. An authentication module 202 of the aggregation module 104a, in certain embodiments, may store and/or manage electronic user credentials locally on the user's hardware device 102, the direct access module 204 may access one or more third-party service providers 108 directly from the user's hardware device 102 (e.g., over the data network 106) to download data associated with the user to the user's hardware device 102, the interface module 206 may provide the data and/or one or more alerts/messages based on the data to the user from the user's hardware device 102, or the like. In the depicted system 400, the aggregation module 104a may create a local repository of data for the user from one or more third-party service providers 108, on the user's hardware device 102, without providing the user's credentials, the user's data, or the like to a different user's hardware device, to a backend server 110, or the like.

Figure 4B:
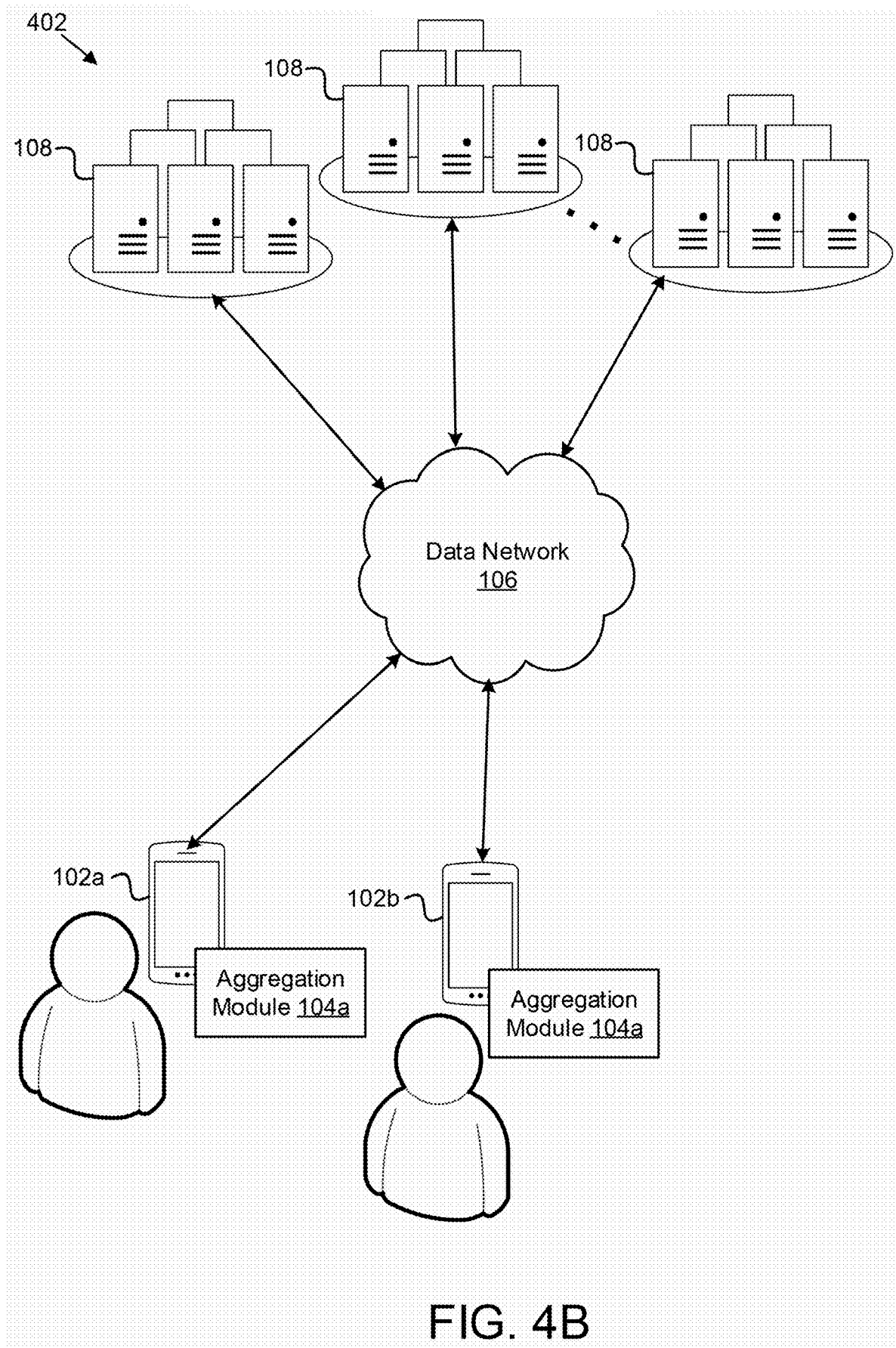
FIG. 4B is a schematic block diagram illustrating a further embodiment of a system for aggregation platform permissions.

FIG. 4B depicts one embodiment of a system 402 for aggregation platform permissions. The system 402, in the depicted embodiment, includes a plurality of user hardware devices 102 with aggregation modules 104a, associated with different users. In certain embodiments, a first aggregation module 104a (e.g., an authentication module 202 of the first aggregation module 104a) may securely provide encrypted user credentials for a first user from the first user's hardware device 102a to a second aggregation module 104a (e.g., an authentication module 202 of the second aggregation module 104a), over the data network 106 or the like, so that a direct access module 204 of the second aggregation module 104a may access one or more third-party service providers 108 from the second user's hardware device 102b (e.g., over the data network 106) to download data associated with the first user.

For example, the second user's hardware device 102b may download data for the first user in response to the first user's hardware device 102a being powered off, being asleep, being blocked from accessing one or more third-party service providers 108, or the like, as determined by a route module 314, or the like. The interface module 206 of the second aggregation module 104a may provide one or more alerts/messages to the first user based on the downloaded data and/or may provide the downloaded data to the first user (e.g., in response to the first user's hardware device 102a becoming available, to a different hardware device 102 associated with the first user, to a backend server 110 to which the first user has access, or the like). As described above, in certain embodiments, the authentication module 202, the direct access module 204, the interface module 206, and/or the route module 314 may encrypt and/or otherwise secure data for the first user (e.g., the first user's electronic credentials, downloaded data associated with the first user, alerts/messages for the first user), so that it is difficult or impossible for the second user to access the data for the first user, thereby preventing and/or minimizing unauthorized access to the first user's data while providing greater flexibility in devices 102 and/or locations from which data for the first user may be downloaded.

Figure 4C:
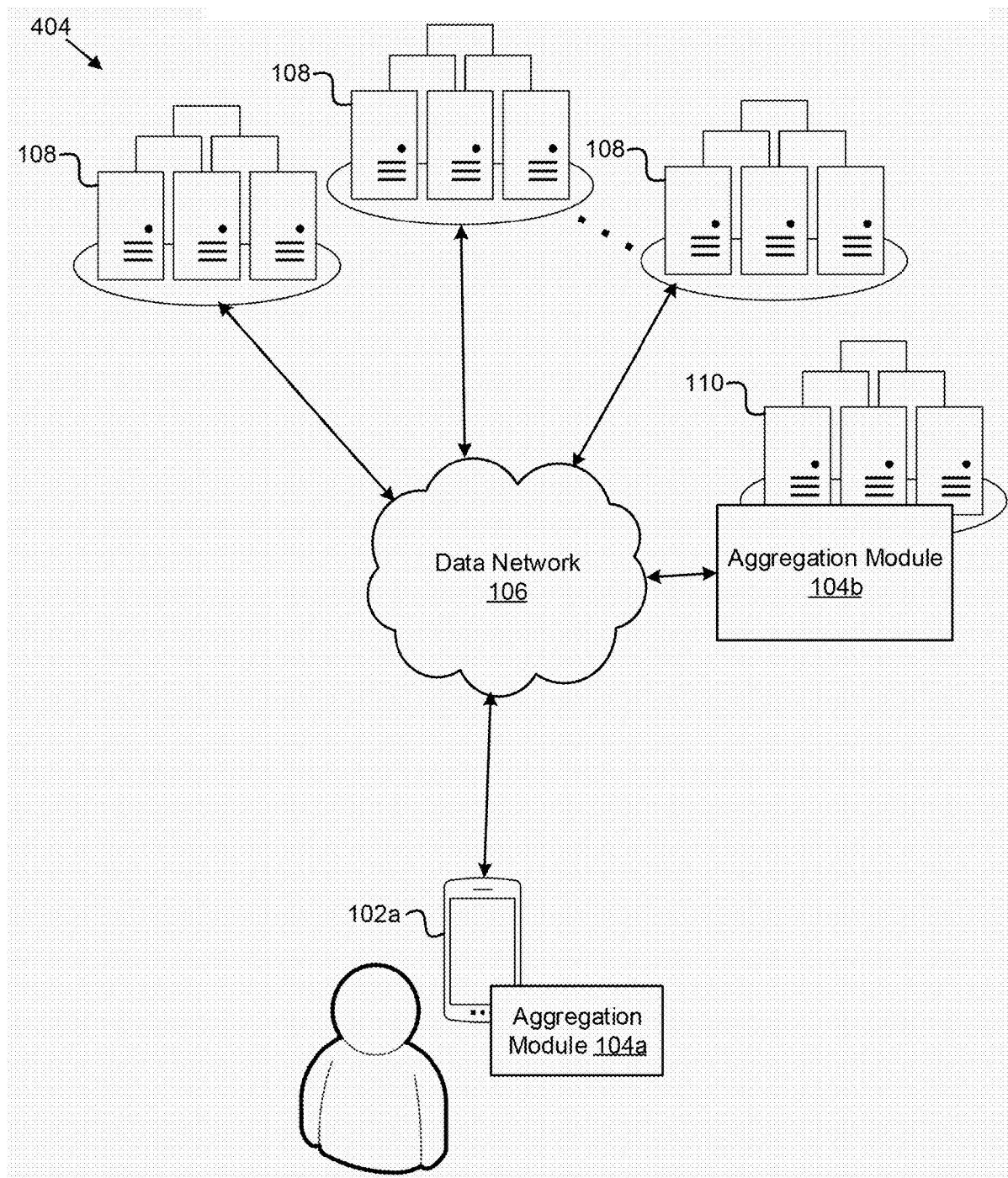
FIG. 4C is a schematic block diagram illustrating a certain embodiment of a system for aggregation platform permissions.

FIG. 4C depicts one embodiment of a system 404 for aggregation platform permissions. The system 404, in the depicted embodiment, includes one or more user hardware devices 102 with one or more aggregation modules 104a, and one or more backend servers 110 comprising one or more backend aggregation modules 104b. An authentication module 202 of an aggregation module 104a, in certain embodiments, may securely provide encrypted user credentials for a user from the user's hardware device 102 to a backend aggregation module 104b (e.g., an authentication module 202 of the backend aggregation module 104b) on a backend server 110, over the data network 106 or the like, so that a direct access module 204 of the backend aggregation module 104b may access one or more third-party service providers 108 from the backend server 110 (e.g., over the data network 106) to download data associated with the user.

For example, the backend server 110 may download data for the user in response to the user's hardware device 102a being powered off, being asleep, being blocked from accessing one or more third-party service providers 108, or the like, as determined by a route module 314, or the like. The interface module 206 of the backend aggregation module 104b may provide one or more alerts/messages to the user based on the downloaded data and/or may provide the downloaded data to the user (e.g., in response to the user's hardware device 102a becoming available, to a different hardware device 102 associated with the first user, directly from the backend server 110 as a web page and/or through a dedicated application, or the like).

Figure 5A:
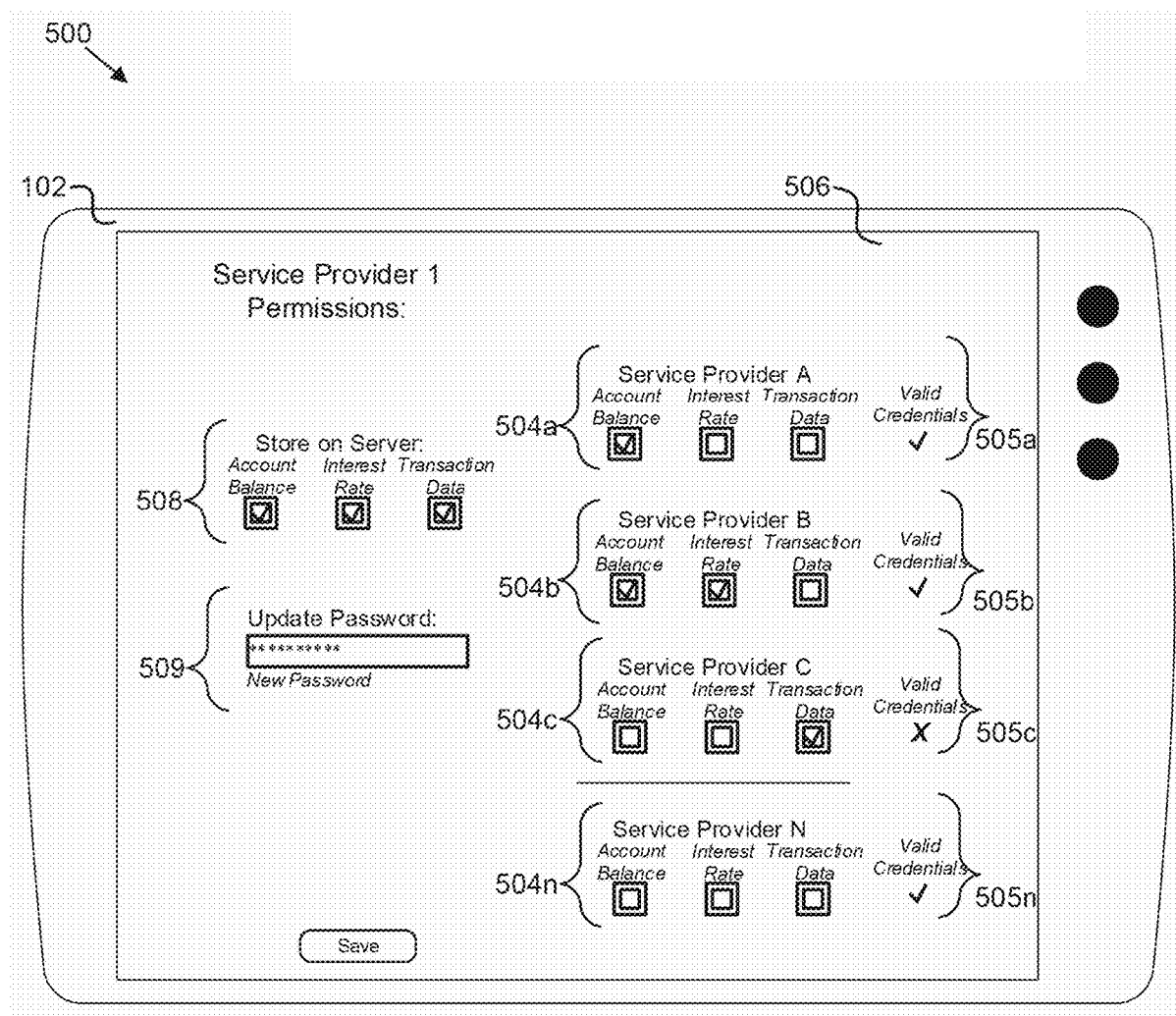
FIG. 5A is a schematic block diagram illustrating one embodiment of a user interface.

FIG. 5A depicts one embodiment of a graphical user interface 500. The GUI 500, in certain embodiments, is provided by a permissions module 112 to a user on an electronic display screen of a hardware device 102, allowing a user to dynamically define and/or adjust access controls, validate and/or update passwords, or the like for one or more third-party service providers 108 that would like access to the user's data aggregated from one or more other third-party service providers 108. In one embodiment, the GUI 500 comprises a web page. In a further embodiment, the GUI 500 comprises a mobile application, a desktop application, and or another graphical user interface displayed on an electronic display screen 506 of a hardware computing device 102. The GUI 500, in certain embodiments, may be embedded within a different GUI of a third-party service provider 108, allowing the user to manage access controls for the third-party service provider 108 directly from within the third-party service provider 108's own GUI.

In the depicted embodiment, a permissions module 112 displays to a user a listing 504a-n of a plurality of third-party service providers A-N 108, which have used similar electronic credentials for the user to access the user's data from a different third-party service provider 1 108. Each listing 504a-n, includes one or more user interface elements (e.g., checkboxes in the depicted embodiment, a slider, buttons, a dropdown menu, radio buttons, and/or other user interface elements) allowing the user to define access permissions individually for each of the third-party service providers A-N 108, with regard to different portions of the downloaded data (e.g., an account balance; an interest rate; transaction data such as a party to a transaction, a date of a transaction, an amount of a transaction, a category for a transaction, a geographic location of a transaction, or the like; and/or other portions of data). In other embodiments, a GUI 500 may include a single button or other user interface element to grant or revoke access, one button or other user interface element to grant access and a second button or other user interface element to revoke access, or the like.

In the depicted embodiment, a permissions module 112 displays to the user indications 505a-n of whether the third-party service providers A-N 108 have valid electronic credentials for the other third-party service provider 1 108 (e.g., displaying a check mark for valid credentials and an "X" for invalid credentials, or the like). A permissions module 112, in the depicted embodiment, also displays, in the GUI 500, an interface 509 for the user to update a password that one of the third-party service providers A-N 108 use for accessing the user's data from the different service provider 1 108. Although a single password update interface 509 is depicted, in other embodiments, a permissions module 112 may provide separate interfaces 509 for different third-party service providers A-N 108, or the like.

A permissions module 112, in the depicted embodiment, also displays an interface 508, within the GUI 500, allowing the user to select which portions of data downloaded/aggregated from the third-party service provider 1 108 are stored and/or maintained in storage on the backend server 110 and/or on another hardware computing device 102, 110 (e.g., for access later by the user, for access by one or more of the third-party service providers A-N 108, or the like). If the user does not select any of the portions of the data to be stored on the backend server 110 and/or another hardware computing device 102, 110, in certain embodiments, a permissions module 112 may provide the data directly to one or more of the third-party service providers A-N 108, without leaving a copy of the data in non-volatile storage of another hardware computing device 102, 110. While access control settings for data of a single third-party service provider 1 108 are depicted, in other embodiments, a permissions module 112 may provide a GUI 500 with access control settings for multiple third-party service providers 108 for which other third-party service providers A-N 108 have access or have requested access to the user's data.

Figure 5B:
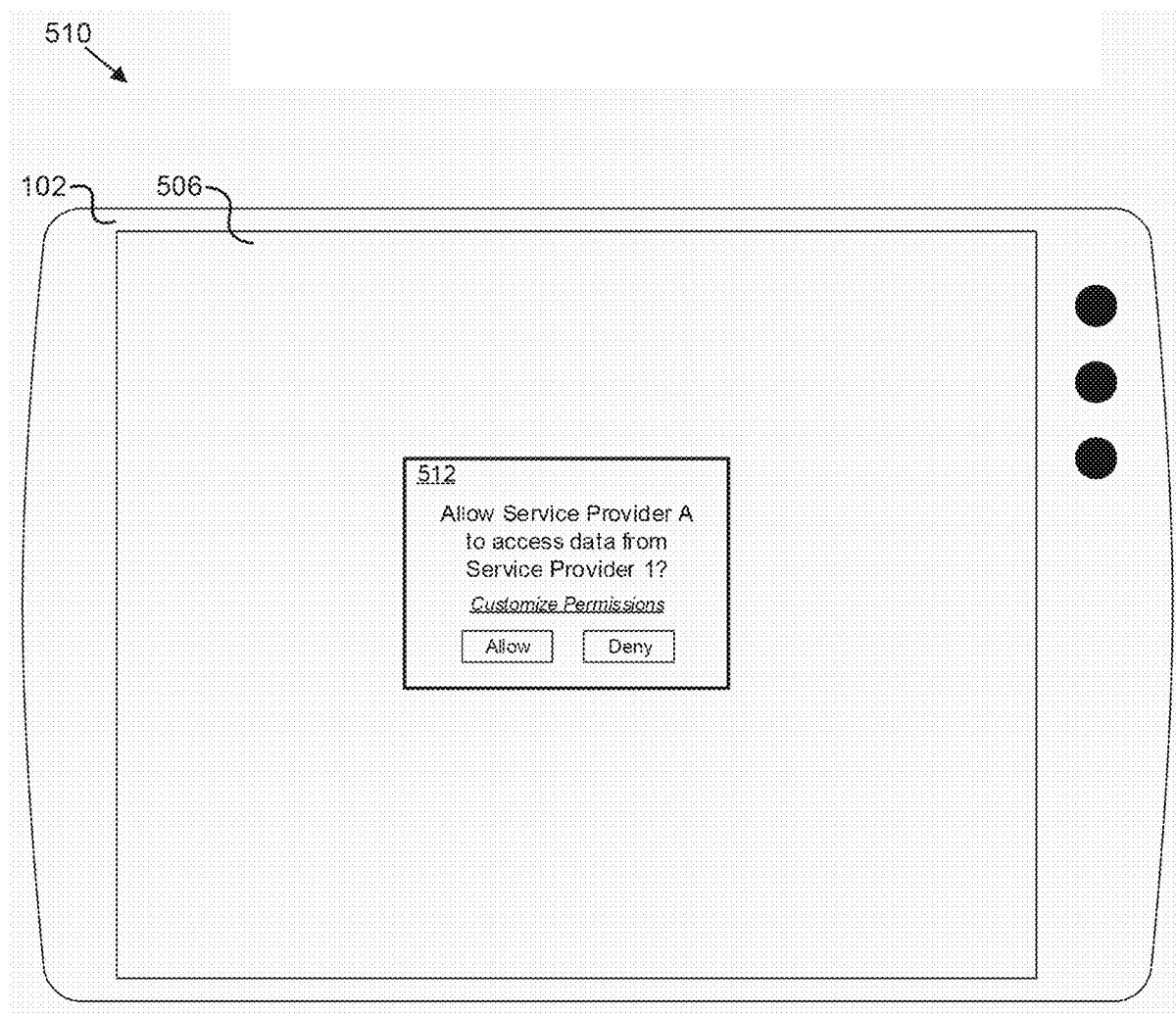
FIG. 5B is a schematic block diagram illustrating another embodiment of a user interface.

FIG. 5B depicts one embodiment of a graphical user interface 510. In certain embodiments, the GUI 510 may be substantially similar to the GUI 500 of FIG. 5A. In certain embodiments, the GUI 500 includes a prompt 512 (e.g., a push notification, a pop up, a text message, an email, an application notification, and/or another message) requesting the user to allow or deny access to a user's data from a first third-party service provider A 108 for a second third-party service provider 1 108.

In some embodiments, a permissions module 112 may display the prompt 512 in response to the second third-party service provider 1 108 requesting access to the user's data (e.g., in a request to the permissions module 112, an aggregation module 104, or the like). In a further embodiment, a permissions module 112 may display the prompt 512 in response to input from the user (e.g., assigning or granting the second third-party service provider 1 108 requesting access to the user's data, or the like).

In some embodiments, the permissions module 112 may display a unique code in the GUI 510 (e.g., in response to the user granting the prompt 512 and allowing access), and the user may provide the unique code to the second third-party service provider 1 108, and the second third-party service provider 1 108 may provide the unique code to the permissions module 112, an aggregation module 104, an associated hardware computing device 102, 110, or the like, in exchange for the user's data from the first third-party service provider A 108. In another embodiment, the second third-party service provider 1 108 may provide the user with a unique code which the user may provide to the permissions module 112 through the GUI 510 in order to identify the specific second third-party service provider 1 108 to the permissions module 112. In other embodiments, the second third-party service provider 1 108 may provide a unique code and/or other identifier of the second third-party service provider 1 108, of the first third-party service provider A 108, of the requested portion of the user's data, and/or other metadata transparently to the user (e.g., as part of an API call or another background message, encoded in a uniform resource locator (URL), or the like) such that the user does not need to provide a unique code and identification and/or authentication is performed automatically.

Figure 6:
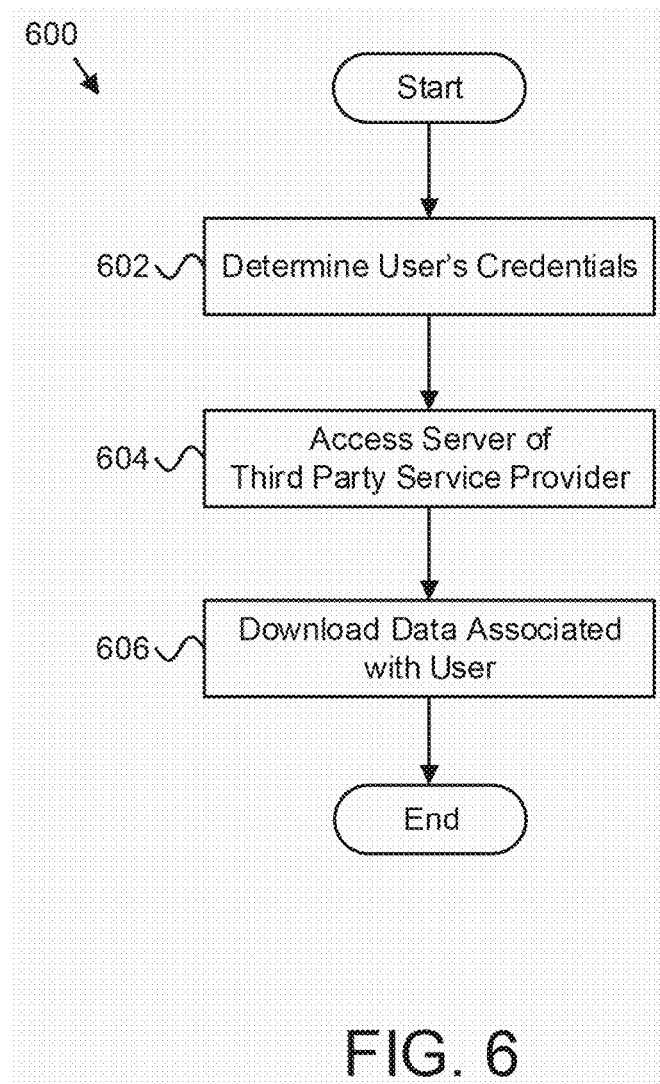
FIG. 6 is a schematic flow chart diagram illustrating one embodiment of a method for aggregation platform permissions.

FIG. 6 depicts one embodiment of a method 600 for aggregation platform permissions. The method 600 begins and an authentication module 202 receives 602 a user's electronic credentials for a third-party service provider 108 from the user on a hardware device 102 of the user. A direct access module 204 accesses 604 a server 108 of the third-party service provider 108, from the hardware device 102 of the user, using the user's electronic credentials. A direct access module 204 downloads 606 data associated with the user from the server 108 of the third-party service provider 108 to the hardware device 102 of the user.

Figure 7:
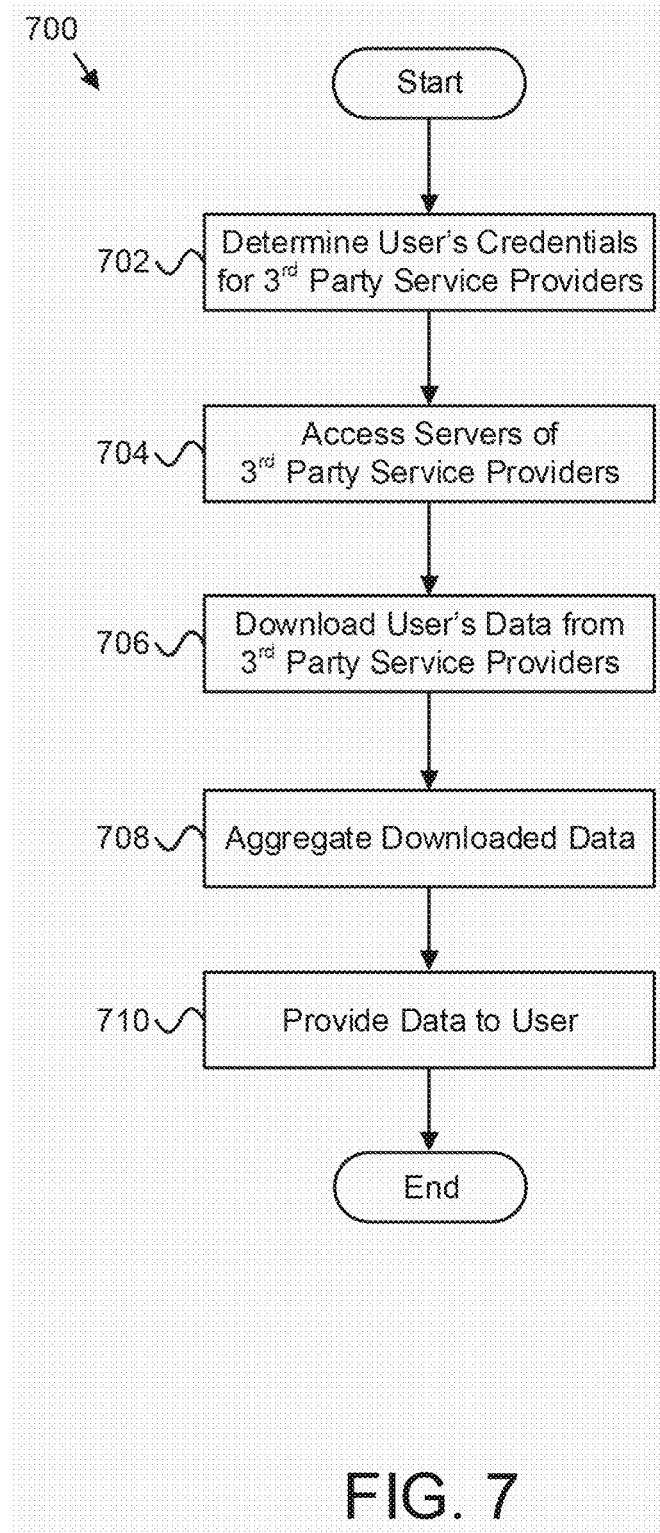
FIG. 7 is a schematic flow chart diagram illustrating a further embodiment of a method for aggregation platform permissions.

FIG. 7 depicts one embodiment of a method 700 for aggregation platform permissions. The method 700 begins and an authentication module 202 determines 702 a user's electronic credentials for a plurality of third-party service providers 108. A direct access module 204 accesses 704 servers of the plurality of third-party service providers 108 using the determined 702 electronic credentials. A direct access module 204 downloads 706 data associated with the user from the accessed 704 servers of the plurality of third-party service providers 108.

A direct access module 204 aggregates 708 the downloaded 706 data from the plurality of different third-party service providers 108. An interface module 206 provides 710 the aggregated 708 data to the user (e.g., displaying the data on a hardware device 102 of the user, sending an alert or other message to a hardware device 102 of the user, sending the data to a remote backend server 110 unaffiliated with the third-party service providers 108 which the user may access using a web interface and/or API, or the like) and the method 700 ends.

Figure 8:
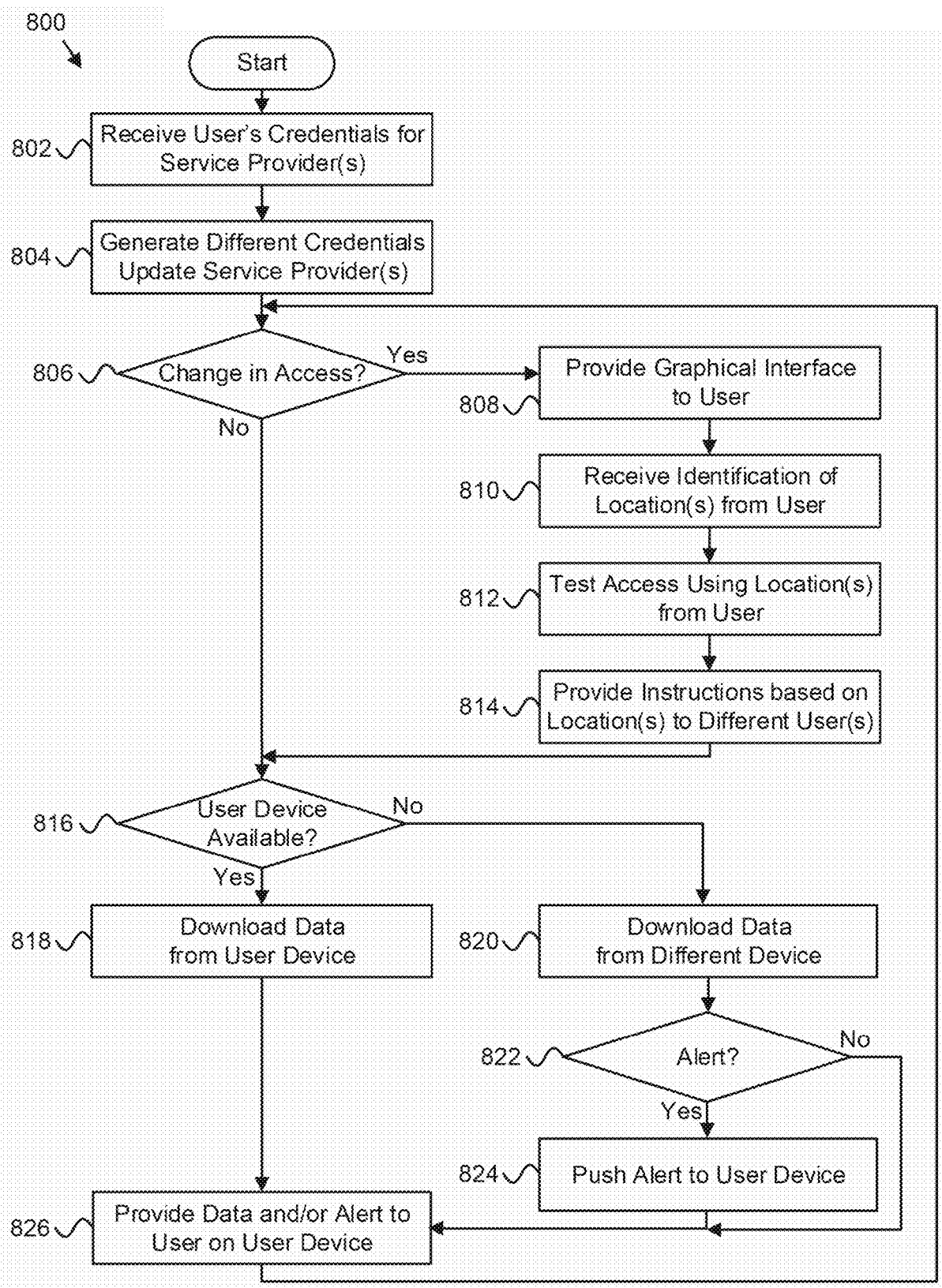
FIG. 8 is a schematic flow chart diagram illustrating another embodiment of a method for aggregation platform permissions.

FIG. 8 depicts another embodiment of a method 800 for aggregation platform permissions. The method 800 begins and a network authentication module 304 receives 802 a user's electronic credentials for one or more third-party service providers 108. A password manager module 306 generates 804 new and/or different electronic credentials for the one or more third-party service providers 108 and updates the user's account(s) with the one or more third-party service providers 108 with the generated 804 electronic credentials.

An access repair module 310 determines 806 whether or not there is a change in access for the one or more third-party service providers 108 (e.g., whether access is broken or unavailable, whether access is partial or incomplete, whether access bandwidth is slower than previously determined, and/or whether another change in access has occurred). If the access repair module 310 determines 806 that access for a third-party service provider 108 has changed, the access repair module 310 provides 808 a graphical user interface 500, 510 to the user. The access repair module 310 receives 810, through the provided 808 graphical user interface 500, 510, an identification of one or more locations and/or actions for authenticating the user and/or downloading data from the third-party service provider 108. The test module 318 tests 812 access to the third-party service provider 108 using the received 810 identification of one or more locations and/or actions. In response to successful testing 812 by the test module 318, the test module 318 and/or the pattern module 308 provide 814 instructions for accessing and/or downloading data from the third-party service provider 108 based on the received 810 identification of one or more locations and/or actions to one or more direct access modules 204 associated with one or more different users.

A route module 314 determines 816 whether a hardware device 102 associated with the user is available. In response to the route module 314 determining 816 that a hardware device 102 associated with the user is available, a direct access module 204 downloads 818 data associated with the user from one or more third-party service providers 108 from the available hardware device 102 associated with the user.

In response to the route module 314 determining 816 that a hardware device 102 associated with the user is not available, a direct access module 204 of a different device (e.g., a hardware device 102 of a different user, a backend server 110, or the like) downloads 820 data associated with the user from one or more third-party service providers 108 from the different device. A route module 314 (e.g., on a different device 102, 110) determines 822 whether an alert or other message is available for the user based on the downloaded 820 data and pushes 824 and/or otherwise sends the alert or other message to a device 102 associated with the user (e.g., an unavailable device 102) in response to determining 822 that the alert or other message is available. For example, in one embodiment, a hardware device 102 of a user may be unavailable for downloading data (e.g., powered down, offline, asleep, using mobile data instead of Wi-Fi, or the like), but may receive a pushed 824 alert or other message anyway (e.g., over a different channel, such as a text message, a voicemail, an email, a push notification, or the like) and/or may receive a pushed 824 alert or other message in response to becoming available at a later time.

An interface module 206 provides 826 the downloaded 818, 820 data and/or the pushed 824 alert to the user (e.g., displaying the data on a hardware device 102 of the user, displaying a pushed/sent 824 alert or other message on a hardware device 102 of the user, sending the data to a remote backend server 110 unaffiliated with the third-party service provider 108 which the user may access using a web interface and/or API, or the like). The method 800, in certain embodiments, continues, periodically determining 806 whether there is a change in access for a third-party service provider 108, determining 816 whether a hardware device 102 of the user is available, downloading 818, 820 data associated with the user, and/or providing 826 downloaded data and/or a pushed 824 alert or other message to the user, or the like.

Figure 9:
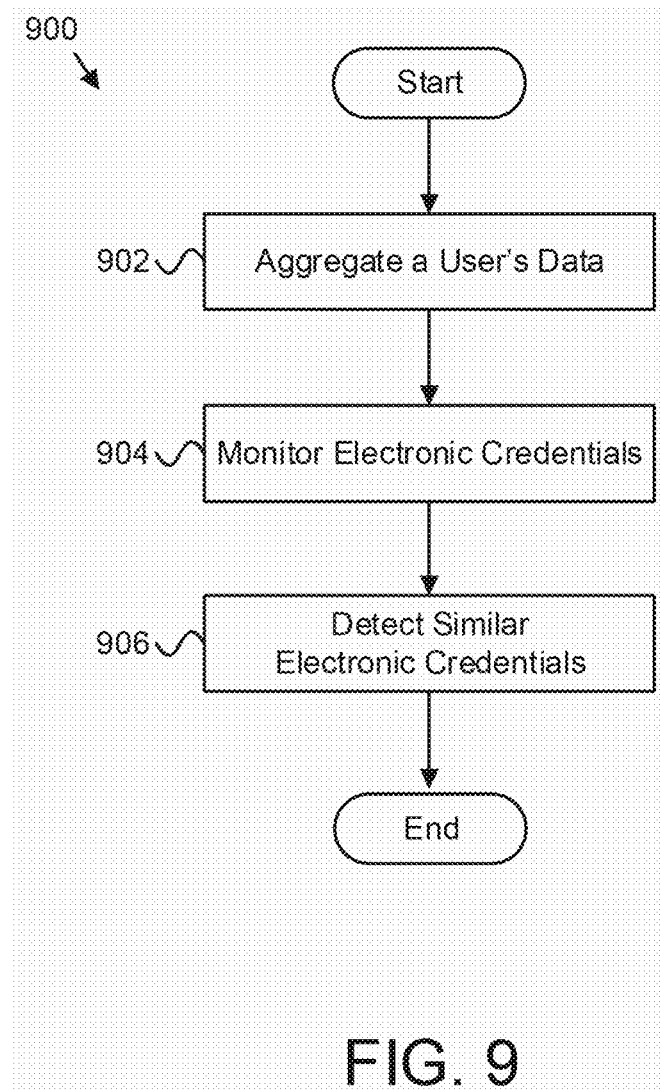
FIG. 9 is a schematic flow chart diagram illustrating a certain embodiment of a method for aggregation platform permissions.

FIG. 9 depicts another embodiment of a method 800 for aggregation platform permissions. The method 900 begins and a hardware computing device 102, 110 (e.g., using an aggregation module 104 and/or a permissions module 112, or the like) aggregates 902 a user's data (e.g., from a first plurality of third-party service providers 108 for a second plurality of third-party service providers 108, on behalf of the user or the like). A permissions module 112 monitors 904 the electronic credentials used to aggregate 902 the user's data. A permissions module 112 detects 906 similar electronic credentials being used to aggregate 902 the user's data (e.g., similar electronic credentials for the same account or the like, being used for multiple third-party service providers 108 on behalf of the user) and the method 900 ends.

Figure 10:
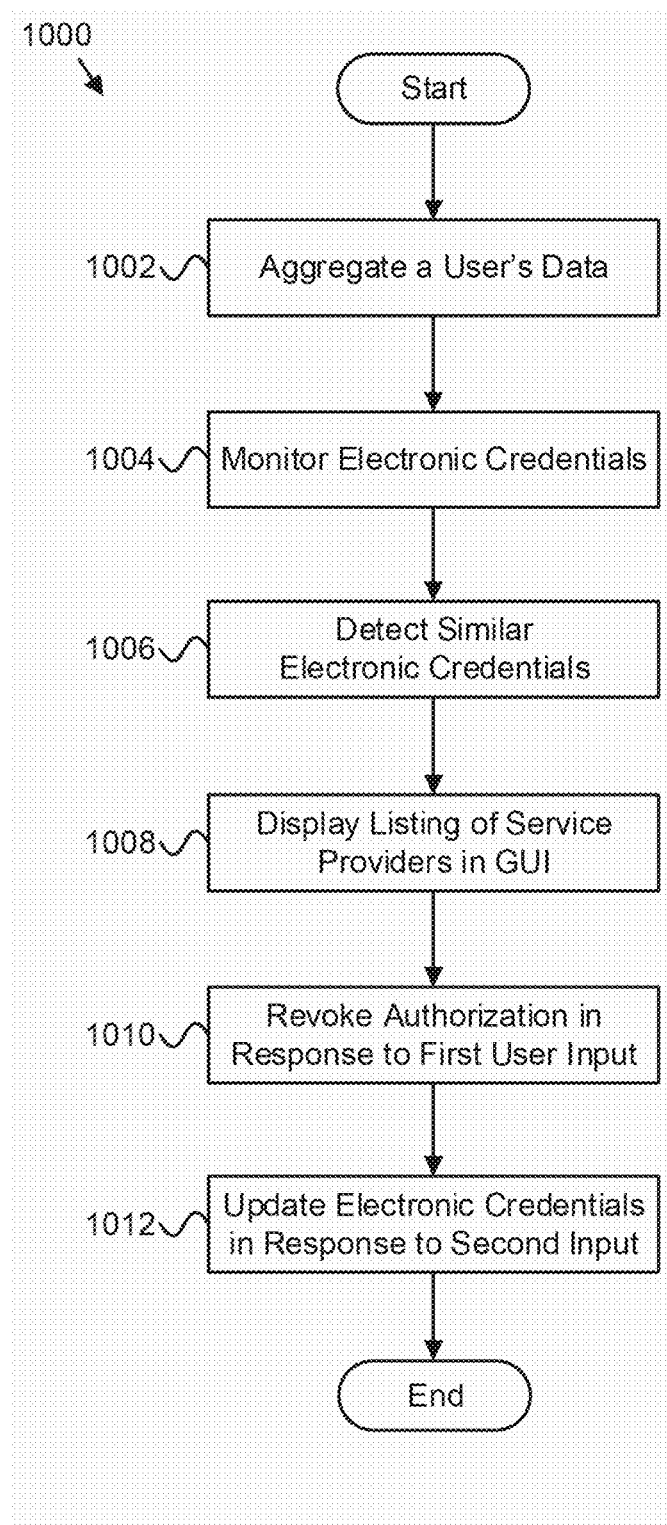
FIG. 10 is a schematic flow chart diagram illustrating one embodiment of a method for aggregation platform permissions.

FIG. 10 depicts another embodiment of a method 800 for aggregation platform permissions. The method 1000 begins and a hardware computing device 102, 110 (e.g., using an aggregation module 104 and/or a permissions module 112, or the like) aggregates 1002 a user's data (e.g., from a first plurality of third-party service providers 108 for a second plurality of third-party service providers 108, on behalf of the user or the like). A permissions module 112 monitors 1004 the electronic credentials used to aggregate 902 the user's data. A permissions module 112 detects 1006 similar electronic credentials being used to aggregate 902 the user's data (e.g., similar electronic credentials for the same account or the like, being used for multiple third-party service providers 108 on behalf of the user).

A permissions module 112 displays 1008 to the user in a graphical user interface a listing of multiple third-party service providers 108 using the detected 1006 similar electronic credentials to aggregate 1002 the user's data. A permissions module 112 revokes 1010 authorization of aggregation 1002 of data from one or more of the multiple third-party service providers 108 using the detected 1006 similar electronic credentials, in response to a first user input from the user in the displayed 1008 graphical user interface. A permissions module 112 updates 1012 the detected 1006 similar electronic credentials for one or more of the multiple third-party service providers 108 in response to receiving an updated password from the user in the displayed 1008 graphical user interface and the method 1000 ends.

A means for aggregating a user's data from a first plurality of third-party service providers 108 over a data network 106 for the user to access through a second plurality of third-party service providers 108, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a mobile hardware device 102, an HDMI or other electronic display dongle, a hardware appliance or other hardware device, other logic hardware, and/or other executable code stored on a computer readable storage medium. Other embodiments may include similar or equivalent means for aggregating a user's data from a first plurality of third-party service providers 108 over a data network 106 for the user to access through a second plurality of third-party service providers 108.

A means for monitoring electronic credentials of a user used by the hardware computing device 102, 110 to download the user's data, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for monitoring electronic credentials of a user used by the hardware computing device 102, 110 to download the user's data.

A means for detecting similar electronic credentials for the same third-party service provider 108 being used on behalf of multiple third-party service providers 108 from a second plurality, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for detecting similar electronic credentials for the same third-party service provider 108 being used on behalf of multiple third-party service providers 108 from a second plurality of third-party service providers 108.

A means for displaying in a graphical user interface a listing of multiple third-party service providers 108, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, an HDMI or other electronic display dongle, an electronic display screen, a hardware appliance or other hardware device, other logic hardware, and/or other executable code stored on a computer readable storage medium. Other embodiments may include similar or equivalent means for displaying in a graphical user interface a listing of multiple third-party service providers 108.

A means for revoking authorization of aggregation of data from one or more of multiple third-party service providers 108 in response to a first user input from a user in the graphical user interface, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for revoking authorization of aggregation of data from one or more of multiple third-party service providers 108 in response to a first user input from a user in the graphical user interface.

A means for updating similar electronic credentials for one or more of multiple third-party service providers 108 in response to receiving an updated password from a user in a graphical user interface, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for updating similar electronic credentials for one or more of multiple third-party service providers 108 in response to receiving an updated password from a user in a graphical user interface.

A means for monitoring which of a second plurality of third-party service providers 108 have access to which portions of data from which of a first plurality of third-party service providers 108, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for monitoring which of a second plurality of third-party service providers 108 have access to which portions of data from which of a first plurality of third-party service providers 108.

A means for displaying in a graphical user interface one or more user interface elements allowing a user to grant and revoke access to portions of data from a first plurality of third-party service providers 108 individually to a second plurality of third-party service providers 108, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, an HDMI or other electronic display dongle, an electronic display screen, a hardware appliance or other hardware device, other logic hardware, and/or other executable code stored on a computer readable storage medium. Other embodiments may include similar or equivalent means for displaying in a graphical user interface one or more user interface elements allowing a user to grant and revoke access to portions of data from a first plurality of third-party service providers 108 individually to a second plurality of third-party service providers 108.

A means for displaying, in response to a user granting access to a portion of data to an authorized third-party service provider 108 from a second plurality of third-party service providers 108, a unique code to the user, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, an HDMI or other electronic display dongle, an electronic display screen, a hardware appliance or other hardware device, other logic hardware, and/or other executable code stored on a computer readable storage medium. Other embodiments may include similar or equivalent means for displaying, in response to a user granting access to a portion of data to an authorized third-party service provider 108 from a second plurality of third-party service providers 108, a unique code to the user.

A means for providing a portion of the data to an authorized third-party service provider 108 in response to the user providing a unique code to the authorized third-party service provider 108 and the authorized third-party service provider 108 providing the unique code to a hardware computing device 102, 110, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for providing a portion of the data to an authorized third-party service provider 108 in response to the user providing a unique code to the authorized third-party service provider 108 and the authorized third-party service provider 108 providing the unique code to a hardware computing device 102, 110.

A means for sharing, with multiple third-party service providers 108, the same data downloaded by a hardware computing device 102, 110 from the same third-party service provider 108 with similar electronic credentials using a same session identity, in various embodiments, may include one or more of a hardware device 102, 110, a backend server 110, a mobile computing device 102, an aggregation module 104, a permissions module 112, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a network interface, a hardware appliance or other hardware device, other logic hardware, and/or other executable code stored on a computer readable storage medium. Other embodiments may include similar or equivalent means for sharing, with multiple third-party service providers 108, the same data downloaded by a hardware computing device 102, 110 from the same third-party service provider 108 with similar electronic credentials using a same session identity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a hardware computing device configured to aggregate a user's data from a first plurality of third-party service providers over a data network for the user to access through a second plurality of third-party service providers;
    a permissions module configured to monitor which of the second plurality of third-party service providers have access to which portions of data from which of the first plurality of third-party service providers; and
    a graphical user interface configured to:
        display one or more user interface elements allowing the user to grant and revoke access to the portions of the data from the first plurality of third-party service providers individually to the second plurality of third-party service providers; and
        display an interface for the user to update a password that the second plurality of third-party service providers uses to access the user's data from at least one of the first plurality of third-party service providers.

2. The apparatus of claim 1, wherein the graphical user interface is configured to prompt the user with the one or more user interface elements in response to an individual third-party service provider from the second plurality of third-party service providers requesting access to at least one of the portions of the data from the first plurality of third-party service providers.

3. The apparatus of claim 1, wherein the portions of data comprise an account balance, an interest rate, and transaction data for individual accounts of the user with the first plurality of third-party service providers.

4. The apparatus of claim 3, wherein the transaction data comprises one or more of a party to a transaction, a date of a transaction, an amount of a transaction, a category for a transaction, and a geographic location of a transaction.

5. The apparatus of claim 1, wherein the graphical user interface is configured to display one or more user interface elements allowing the user to define which or the portions of the data from which of the first plurality of third-party service providers are maintained in storage by the hardware computing device for remote access by the user.

6. The apparatus of claim 1, wherein the graphical user interface is configured to display one or more user interface elements allowing the user to define which or the portions of the data from which of the first plurality of third-party service providers are maintained in storage by the hardware computing device for remote access by one or more of the second plurality of third-party service providers.

7. The apparatus of claim 1, wherein the graphical user interface is configured to, in response to the user granting access to a portion of the data to an authorized third-party service provider from the second plurality of third-party service providers, display a unique code to the user, the user providing the unique code to the authorized third-party service provider, and the authorized third-party service provider providing the unique code to the hardware computing device in exchange for the portion of the data.

8. The apparatus of claim 1, wherein the graphical user interface is displayed to the user embedded within a third-party graphical user interface of one of the second plurality of third-party service providers.

9. The apparatus of claim 1, wherein the hardware computer device comprises a trusted intermediary for the user between the first plurality of third-party service providers and the second plurality of third-party service providers such that the user may dynamically manage and adjust, using the graphical user interface, which of the second plurality of third-party service providers have access to which of the portions of the data from the first plurality of third-party service providers.

10. A method, comprising:
aggregating a user's data to a hardware computing device from a first plurality of third-party service providers over a data network for the user to access through a second plurality of third-party service providers;
monitoring which of the second plurality of third-party service providers have access to which portions of data from which of the first plurality of third-party service providers; and
displaying in a graphical user interface:
one or more user interface elements allowing the user to grant and revoke access to the portions of the data from the first plurality of third-party service providers individually to the second plurality of third-party service providers; and
an interface for the user to update a password that the second plurality of third-party service providers uses to access the user's data from at least one of the first plurality of third-party service providers.

11. The method of claim 10, further comprising prompting the user with the one or more user interface elements in response to an individual third-party service provider from the second plurality of third-party service providers requesting access to at least one of the portions of the data from the first plurality of third-party service providers.

12. The method of claim 10, wherein the portions of data comprise an account balance, an interest rate, and transaction data for individual accounts of the user with the first plurality of third-party service providers.

13. The method of claim 12, wherein the transaction data comprises one or more of a party to a transaction, a date of a transaction, an amount of a transaction, a category for a transaction, and a geographic location of a transaction.

14. The method of claim 10, further comprising displaying one or more user interface elements allowing the user to define which or the portions of the data from which of the first plurality of third-party service providers are maintained in storage by the hardware computing device for remote access by the user.

15. The method of claim 10, further comprising displaying one or more user interface elements allowing the user to define which or the portions of the data from which of the first plurality of third-party service providers are maintained in storage by the hardware computing device for remote access by one or more of the second plurality of third-party service providers.

16. The method of claim 10, further comprising:
displaying, in response to the user granting access to a portion of the data to an authorized third-party service provider from the second plurality of third-party service providers, a unique code to the user; and
providing the portion of the data to the authorized third-party service provider in response to the user providing the unique code to the authorized third-party service provider and the authorized third-party service provider providing the unique code to the hardware computing device.

17. The method of claim 10, further comprising embedding the graphical user interface within a third-party graphical user interface of one of the second plurality of third-party service providers displayed to the user.

18. The method of claim 10, wherein the hardware computer device comprises a trusted intermediary for the user between the first plurality of third-party service providers and the second plurality of third-party service providers such that the user may dynamically manage and adjust, using the graphical user interface, which of the second plurality of third-party service providers have access to which of the portions of the data from the first plurality of third-party service providers.

19. An apparatus, comprising:
means for aggregating a user's data to a hardware computing device from a first plurality of third-party service providers over a data network for the user to access through a second plurality of third-party service providers;
means for monitoring which of the second plurality of third-party service providers have access to which portions of data from which of the first plurality of third-party service providers; and
means for displaying in a graphical user interface:
one or more user interface elements allowing the user to grant and revoke access to the portions of the data from the first plurality of third-party service providers individually to the second plurality of third-party service providers; and
an interface for the user to update a password that the second plurality of third-party service providers uses to access the user's data from at least one of the first plurality of third-party service providers.

20. The apparatus of claim 19, further comprising:
means for displaying, in response to the user granting access to a portion of the data to an authorized third-party service provider from the second plurality of third-party service providers, a unique code to the user; and
means for providing the portion of the data to the authorized third-party service provider in response to the user providing the unique code to the authorized third-party service provider and the authorized third-party service provider providing the unique code to the hardware computing device.

* * * * *